(12) United States Patent
Hosseini et al.

(10) Patent No.: US 10,595,313 B2
(45) Date of Patent: Mar. 17, 2020

(54) TECHNIQUES FOR CROSS-CARRIER SCHEDULING USING MULTIPLE TRANSMISSION TIME INTERVAL DURATIONS

(71) Applicant: QUALCOMM Incorporated, San Diego, CA (US)

(72) Inventors: Seyedkianoush Hosseini, San Diego, CA (US); Wanshi Chen, San Diego, CA (US); Peter Gaal, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/789,776

(22) Filed: Oct. 20, 2017

(65) Prior Publication Data

US 2018/0213532 A1 Jul. 26, 2018

Related U.S. Application Data

(60) Provisional application No. 62/450,065, filed on Jan. 24, 2017.

(51) Int. Cl.
*H04W 72/04* (2009.01)
*H04W 72/12* (2009.01)
(Continued)

(52) U.S. Cl.
CPC ......... *H04W 72/0446* (2013.01); *H04L 5/001* (2013.01); *H04L 5/0037* (2013.01);
(Continued)

(58) Field of Classification Search
CPC ........... H04W 72/0446; H04W 72/044; H04W 72/04; H04W 72/00; H04W 72/1231;
(Continued)

(56) References Cited

U.S. PATENT DOCUMENTS 9,131,498 B2 9/2015 Au et al.
9,357,527 B2 5/2016 Lv
(Continued)

FOREIGN PATENT DOCUMENTS

WO WO 2017056020 A1 4/2017

OTHER PUBLICATIONS

Discussion on CA issues for shortened TTI operation, R1-1611193 (Year: 2016).*
(Continued)

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communication are described in which scheduling of time and frequency resources for multiple component carriers (CCs) may be provided in a low latency physical downlink control channel (sPDCCH) transmission to a user equipment (UE). The scheduling information may include a first portion that is transmitted during a first transmission time interval (TTI) and that includes scheduling information (UE-specific or common for multiple UEs) for two or more shortened TTIs (sTTIs) on one or more CCs, and a second portion that may be specific to the particular sTTI on one or more CCs. Rate matching information may be provided to indicate portions of the sPDCCH that may be reallocated for shared channel transmissions. The scheduling information may be, in some cases, provided in a single-level scheduling information transmission for two or more UEs, that provides UE-specific resources on one or more CCs.

30 Claims, 24 Drawing Sheets

(51) Int. Cl.
    H04W 72/14    (2009.01)
    H04L 5/00     (2006.01)
(52) U.S. Cl.
    CPC .......... H04L 5/0044 (2013.01); H04L 5/0053 (2013.01); H04W 72/048 (2013.01); H04W 72/1231 (2013.01); H04W 72/14 (2013.01); H04W 72/042 (2013.01)
(58) Field of Classification Search
    CPC ......... H04W 72/1226; H04W 72/1205; H04W 72/12; H04W 72/048; H04W 72/14; H04W 72/042; H04W 72/0406; H04L 5/00; H04B 7/2618; H04B 7/26; H04B 7/24
    USPC ........................................................ 370/336
    See application file for complete search history.

(56) References Cited

U.S. PATENT DOCUMENTS

| | | | | |
|---|---|---|---|---|
| 2013/0028205 | A1* | 1/2013 | Damnjanovic | H04L 5/001 370/329 |
| 2013/0258864 | A1* | 10/2013 | Chen | H04L 1/1854 370/241 |
| 2014/0029586 | A1* | 1/2014 | Loehr | H04W 56/0005 370/336 |
| 2015/0215082 | A1* | 7/2015 | Agiwal | H04L 1/1822 370/336 |
| 2015/0341921 | A1* | 11/2015 | Chen | H04W 72/0413 370/330 |
| 2016/0295584 | A1 | 10/2016 | Chen et al. | |
| 2017/0118054 | A1 | 4/2017 | Ma et al. | |

OTHER PUBLICATIONS

International Search Report and Written Opinion—PCT/US2018/014537—ISA/EPO—Apr. 10, 2018 (171715WO).

Catt: "Design of sPDCCH for Shortened TTI", 3GPP Draft; R1-164232, 3rd Generation Partnership Project (3GPP), Mobile Competence Centre; 650, Route Des Lucioles; F-06921 Sophia-Antipolis Cedex; France, vol. RAN WG1, No. Nanjing, China; 20160523-20160527, May 14, 2016 (May 14, 2016), 5 Pages, XP051096521, Retrieved from the Internet: URL: http://www.3gpp.org/ftp/tsg_ran/WG1_RL1/TSGR1_85/Docs/ [retrieved on May 14, 2016].

Ericsson: "Short TTI Operation with Carrier Aggregation", 3GPP Draft; R1-163324, 3rd Generation Partnership Project (3GPP), Mobile Competence Centre; 650, Route Des Lucioles; F-06921 Sophia-Antipolis Cedex; France, vol. RAN WG1, No. Busan; 20160411-20160415, Apr. 1, 2016 (Apr. 1, 2016), 3 Pages, XP051079814, Retrieved from the Internet: URL: http://www.3gpp.org/ftp/tsg_ran/WG1_RL1/TSGR1_84b/Docs/ [retrieved on Apr. 1, 2016].

Etri: "Discussion on Numerology Multiplexing in NR", 3GPP Draft; R1-166940 Discussion on Numerology Multiplexing in NR, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; 20160822-20160826, Aug. 21, 2016 (Aug. 21, 2016), pp. 1-4, XP051140445, Retrieved from the Internet: URL: http://www.3gpp.org/ftp/Meetings_3GPP_SYNC/RAN1/Docs/ [retrieved on Aug. 21, 2016].

Huawei, et al., "Details of Two-Level DCI Schemes for Short TTI", 3GPP Draft; R1-1608634, 3rd Generation Partnership Project (3GPP), Mobile Competence Centre; 650, Route Des Lucioles; F-06921 Sophia-Antipolis Cedex; France, vol. RAN WG1, No. Lisbon, Portugal; 20161010-20161014, Oct. 9, 2016 (Oct. 9, 2016), 7 Pages, XP051148693, Retrieved from the Internet: URL: http://www.3gpp.org/ftp/Meetings_3GPP_SYNC/RAN1/Docs/ [retrieved on Oct. 9, 2016].

Huawei, et al., "Discussion on CA Issues for Shortened TTI Operation", 3GPP Draft; R1-1611193, 3rd Generation Partnership Project (3GPP), Mobile Competence Centre; 650, Route Des Lucioles; F-06921 Sophia-Antipolis Cedex; France, vol. RAN WG1, No. Reno, USA; 20161114-20161118, Nov. 13, 2016 (Nov. 13, 2016), 4 Pages, XP051175174, Retrieved from the Internet: URL: http://www.3gpp.org/ftp/Meetings_3GPP_SYNC/RAN1/Docs/ [retrieved on Nov. 13, 2016].

\* cited by examiner

TECHNIQUES FOR CROSS-CARRIER SCHEDULING USING MULTIPLE TRANSMISSION TIME INTERVAL DURATIONS

CROSS REFERENCES

The present application for patent claims priority to U.S. Provisional Patent Application No. 62/450,065 by Hosseini, et al., entitled "Techniques For Cross-Carrier Scheduling Using Multiple Transmission Time Interval Durations," filed Jan. 24, 2017, assigned to the assignee hereof, and which is hereby expressly incorporated by reference herein in its entirety.

BACKGROUND

The following relates generally to wireless communication, and more specifically to techniques for cross-carrier scheduling using multiple transmission time interval durations.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system, or a New Radio (NR) system). A wireless multiple-access communications system may include a number of base stations or access network nodes, each simultaneously supporting communication for multiple communication devices, which may be otherwise known as user equipment (UE).

In a LTE or LTE-Advanced (LTE-A) network, a set of one or more base stations may define an eNodeB (eNB). In other examples (e.g., in a NR or 5G network), a wireless multiple access communication system may include a number of smart radio heads (RHs) in communication with a number of access node controllers (ANCs), where a set of one or more RHs, in communication with an ANC, defines a base station (e.g., an eNB or gNB). A base station may communicate with a set of UEs on downlink (DL) channels (e.g., for transmissions from a base station to a UE) and uplink (UL) channels (e.g., for transmissions from a UE to a base station).

A base station in some LTE or NR deployments may transmit downlink transmissions to one or more UEs, and the one or more UEs may transmit uplink transmissions back to the base station. In some cases, a base station may transmit to one or more UEs using a transmission time interval (TTI) that is reduced in length relative to other TTIs that may be configured. Such a TTI may be referred to as a shortened TTI (sTTI) and users receiving an sTTI may be using a low latency service provided by the LTE or NR network. In some cases, multiple component carriers (CCs) may be configured for communications between a base station and one or more UEs. Efficient scheduling of sTTI resources across multiple CCs for one or more UEs may be desirable in order to preserve the relatively few sTTI resources that are available for low latency communications.

SUMMARY

A base station may indicate time and frequency resources for a low latency physical downlink control channel (sPDCCH) to a user equipment (UE) or multiple UEs. The sPDCCH may include scheduling information for two or more component carriers (CCs) to be used in carrier aggregation operation, and may be transmitted over a primary CC, in some examples. The scheduling information may include a first portion of the scheduling information that is transmitted during a first sTTI and that includes UE-specific scheduling information, or common scheduling information for multiple UEs, that may include relatively slowly changing scheduling information for two or more sTTIs on one or more CCs, and a second portion of the scheduling information may be specific to the particular sTTI on one or more CCs. In some cases, the second portion of the scheduling information is transmitted only on the CC that includes a grant for a particular sTTI. In other cases, the second portion of the scheduling information for one or more secondary CCs may be transmitted over the primary CC. In further cases, the scheduling information may be single-level scheduling information for two or more UEs that provides UE-specific resources on one or more CCs.

A method of wireless communication is described. The method may include identifying a first TTI duration for at least a first set of TTIs to be used for communications over at least a first component carrier and a second component carrier, identifying a second TTI duration for at least a second set of TTIs to be used for communications over one or more of the first component carrier or the second component carrier, the first TTI duration being shorter than the second TTI duration, and receiving, over the first component carrier, scheduling information for the second component carrier, the scheduling information indicating resources for transmissions over at least a subset of the first set of TTIs.

An apparatus for wireless communication is described. The apparatus may include means for identifying a first TTI duration for at least a first set of TTIs to be used for communications over at least a first component carrier and a second component carrier, means for identifying a second TTI duration for at least a second set of TTIs to be used for communications over one or more of the first component carrier or the second component carrier, the first TTI duration being shorter than the second TTI duration, and means for receiving, over the first component carrier, scheduling information for the second component carrier, the scheduling information indicating resources for transmissions over at least a subset of the first set of TTIs.

Another apparatus for wireless communication is described. The apparatus may include a processor, memory in electronic communication with the processor, and instructions stored in the memory. The instructions may be operable to cause the processor to identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, and receive, over the first component carrier, scheduling information for the second component carrier, the scheduling information indicating resources for transmissions over at least a subset of the first set of TTIs.

A non-transitory computer readable medium for wireless communication is described. The non-transitory computer-readable medium may include instructions operable to cause a processor to identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, and receive, over the first component carrier, scheduling information for the second component carrier, the scheduling information indicating resources for transmissions over at least a subset of the first set of TTIs.

Some examples of the method, apparatus, and non-transitory computer-readable medium described above may further include processes, features, means, or instructions for receiving a downlink transmission over the second component carrier based at least in part on the scheduling information, wherein the received scheduling information comprises a downlink grant.

Some examples of the method, apparatus, and non-transitory computer-readable medium described above may further include processes, features, means, or instructions for transmitting an uplink transmission over the second component carrier based at least in part on the scheduling information, wherein the received scheduling information comprises an uplink grant.

In some examples of the method, apparatus, and non-transitory computer-readable medium described above, the receiving the scheduling information comprises receiving, over the first component carrier, a first portion of the scheduling information during a first TTI of the second set of TTIs, wherein the first portion of the scheduling information may be for two or more TTIs in the first set of TTIs, and receiving, over the second component carrier, a second portion of the scheduling information during a first TTI of the first set of TTIs, wherein the second portion of the scheduling information may be for the first TTI of the first set of TTIs.

In some examples of the method, apparatus, and non-transitory computer-readable medium described above, the first portion of the scheduling information comprises common scheduling information for two or more UEs for use in receiving transmissions over two or more TTIs of the first set of TTIs, and the second portion of the scheduling information comprises UE-specific scheduling information for use in receiving transmissions over the first TTI of the first set of TTIs. In some examples of the method, apparatus, and non-transitory computer-readable medium described above, the common scheduling information comprises one or more of a frequency band of one or more TTIs of the first set of TTIs or a search space associated with the second portion of the scheduling information. In some examples of the method, apparatus, and non-transitory computer-readable medium described above, the UE-specific scheduling information comprises one or more of a resource assignment, a feedback process identification, a new data indicator (NDI), or a redundancy version (RV) associated with the first TTI of the first set of TTIs.

In some examples of the method, apparatus, and non-transitory computer-readable medium described above, the first portion of the scheduling information comprises first UE-specific scheduling information for use in receiving transmissions over two or more TTIs of the first set of TTIs, and the second portion of the scheduling information comprises second UE-specific scheduling information for use in receiving transmissions over the first TTI of the first set of TTIs. In some examples of the method, apparatus, and non-transitory computer-readable medium described above, the first UE-specific scheduling information comprises one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information comprises one or more of a resource assignment, a feedback process identification, a NDI, or a RV associated with the first TTI of the first set of TTIs.

In some examples of the method, apparatus, and non-transitory computer-readable medium described above, the scheduling information comprises single-level scheduling for two or more UEs that provides UE-specific resources on two or more component carriers for the first set of TTIs.

In some examples of the method, apparatus, and non-transitory computer-readable medium described above, the receiving the scheduling information comprises receiving, over the first component carrier, a first portion of the scheduling information during a first TTI of the second set of TTIs, wherein the first portion of the scheduling information may be for two or more TTIs in the first set of TTIs, and receiving, over the first component carrier, a second portion of the scheduling information during a first TTI of the first set of TTIs, where the second portion of the scheduling information may be for a second TTI of the first set of TTIs that may be transmitted over the second component carrier.

In some examples of the method, apparatus, and non-transitory computer-readable medium described above, the first portion of the scheduling information comprises common scheduling information for two or more UEs for use in receiving transmissions over two or more TTIs of the first set of TTIs, and the second portion of the scheduling information comprises UE-specific scheduling information for use in receiving transmissions over the second TTI of the first set of TTIs. In some examples of the method, apparatus, and non-transitory computer-readable medium described above, the common scheduling information comprises one or more of a frequency band of one or more TTIs of the first set of TTIs or a search space associated with the second portion of the scheduling information, and the UE-specific scheduling information comprises one or more of a resource assignment, a feedback process identification, a NDI, or a RV associated with the first TTI of the first set of TTIs.

In some examples of the method, apparatus, and non-transitory computer-readable medium described above, the first portion of the scheduling information comprises first UE-specific scheduling information for use in receiving transmissions over two or more TTIs of the first set of TTIs, and the second portion of the scheduling information comprises second UE-specific scheduling information for use in receiving transmissions over the first TTI of the first set of TTIs. In some examples of the method, apparatus, and non-transitory computer-readable medium described above, the first UE-specific scheduling information comprises one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information comprises one or more of a resource assignment, a feedback process identification, a NDI, or a RV associated with the second TTI of the first set of TTIs.

In some examples of the method, apparatus, and non-transitory computer-readable medium described above, the second portion of the scheduling information includes two or more grants for one or more UEs. In some examples of the method, apparatus, and non-transitory computer-readable medium described above, the two or more grants include a first resource grant for a first UE that indicates second TTI resources on the second component carrier, and a second resource grant for a second UE that indicates first TTI resources on the first component carrier, and wherein the first TTI resources may be rate-matched around the first resource grant and the second resource grant. In some examples of the method, apparatus, and non-transitory computer-readable medium described above, the two or more grants may be downlink grants and the first resource grant may be located before the second resource grant in the first TTI of the first set of TTIs. In some examples of the method, apparatus, and non-transitory computer-readable medium described above, the two or more grants may be downlink grants and the first resource grant may be located after the second resource grant in the first TTI of the first set of TTIs.

In some examples of the method, apparatus, and non-transitory computer-readable medium described above, the second portion of the scheduling information further includes an indication of a starting location within the first TTI of the first set of TTIs of the second resource grant. In some examples of the method, apparatus, and non-transitory computer-readable medium described above, the first resource grant and second resource grant indicate one or more of a resource assignment, a feedback process identification, a new data indicator (NDI), or a redundancy version (RV).

In some examples of the method, apparatus, and non-transitory computer-readable medium described above, the scheduling information comprises UE-specific scheduling information for two or more UEs and an indication of resources on two or more component carriers for the first set of TTIs. In some examples of the method, apparatus, and non-transitory computer-readable medium described above, the UE-specific scheduling information for the two or more UEs includes a first resource grant for a first UE that indicates first TTI resources on the second component carrier, and a second resource grant for a second UE that indicates first TTI resources on the first component carrier, and the first TTI resources may be rate-matched around the first resource grant and the second resource grant.

A method of wireless communication is described. The method may include identifying a first TTI duration for at least a first set of TTIs to be used for communications over at least a first component carrier and a second component carrier, identifying a second TTI duration for at least a second set of TTIs to be used for communications over one or more of the first component carrier or the second component carrier, the first TTI duration being shorter than the second TTI duration, transmitting, over the first component carrier, scheduling information for the second component carrier, the scheduling information indicating resources for transmissions over at least a subset of the first set of TTIs, and transmitting a downlink transmission over the second component carrier based at least in part on the scheduling information.

An apparatus for wireless communication is described. The apparatus may include means for identifying a first TTI duration for at least a first set of TTIs to be used for communications over at least a first component carrier and a second component carrier, means for identifying a second TTI duration for at least a second set of TTIs to be used for communications over one or more of the first component carrier or the second component carrier, the first TTI duration being shorter than the second TTI duration, means for transmitting, over the first component carrier, scheduling information for the second component carrier, the scheduling information indicating resources for transmissions over at least a subset of the first set of TTIs, and means for transmitting a downlink transmission over the second component carrier based at least in part on the scheduling information.

Another apparatus for wireless communication is described. The apparatus may include a processor, memory in electronic communication with the processor, and instructions stored in the memory. The instructions may be operable to cause the processor to identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, transmit, over the first component carrier, scheduling information for the second component carrier, the scheduling information indicating resources for transmissions over at least a subset of the first set of TTIs, and transmit a downlink transmission over the second component carrier based at least in part on the scheduling information.

A non-transitory computer readable medium for wireless communication is described. The non-transitory computer-readable medium may include instructions operable to cause a processor to identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, transmit, over the first component carrier, scheduling information for the second component carrier, the scheduling information indicating resources for transmissions over at least a subset of the first set of TTIs, and transmit a downlink transmission over the second component carrier based at least in part on the scheduling information.

In some examples of the method, apparatus, and non-transitory computer-readable medium described above, the transmitting the scheduling information comprises transmitting, over the first component carrier, a first portion of the scheduling information during a first TTI of the second set of TTIs, where the first portion of the scheduling information may be for two or more TTIs in the first set of TTIs, and transmitting, over the second component carrier, a second portion of the scheduling information during a first TTI of the first set of TTIs, where the second portion of the scheduling information may be for the first TTI of the first set of TTIs.

In some examples of the method, apparatus, and non-transitory computer-readable medium described above, the first portion of the scheduling information comprises common scheduling information for two or more TTIs of the first set of TTIs for two or more UEs, and wherein the second portion of the scheduling information comprises UE-specific scheduling information for the first TTI of the first set of TTIs. In some examples of the method, apparatus, and non-transitory computer-readable medium described above, the common scheduling information comprises one or more of a frequency band of one or more TTIs of the first set of TTIs or a search space associated with the second portion of the scheduling information. In some examples of the method, apparatus, and non-transitory computer-readable medium described above, the UE-specific scheduling information comprises one or more of a resource assignment, a feedback process identification, a NDI, or a RV associated with the first TTI of the first set of TTIs.

In some examples of the method, apparatus, and non-transitory computer-readable medium described above, the first portion of the scheduling information comprises first UE-specific scheduling information for two or more TTIs of the first set of TTIs, and wherein the second portion of the scheduling information comprises second UE-specific scheduling information for the first TTI of the first set of TTIs. In some examples of the method, apparatus, and non-transitory computer-readable medium described above, the first UE-specific scheduling information comprises one or more of a frequency band, a search space associated with the second portion of the scheduling information, a MCS, precoding information, antenna port information, or an aggregation level for one or more TTIs of the first set of TTIs, and the second UE-specific scheduling information comprises one or more of a resource assignment, a feedback process identification, a NDI, or a RV associated with the first TTI of the first set of TTIs.

In some examples of the method, apparatus, and non-transitory computer-readable medium described above, the scheduling information comprises single-level scheduling for two or more UEs that provides UE-specific resources on two or more component carriers for the first set of TTIs.

In some examples of the method, apparatus, and non-transitory computer-readable medium described above, the transmitting the scheduling information comprises transmitting, over the first component carrier, a first portion of the scheduling information during a first TTI of the second set of TTIs, where the first portion of the scheduling information may be for two or more TTIs in the first set of TTIs, and transmitting, over the first component carrier, a second portion of the scheduling information during a first TTI of the first set of TTIs, where the second portion of the scheduling information may be for a second TTI of the first set of TTIs that may be transmitted over the second component carrier.

In some examples of the method, apparatus, and non-transitory computer-readable medium described above, the first portion of the scheduling information comprises common scheduling information for two or more UEs for two or more TTIs of the first set of TTIs, and the second portion of the scheduling information comprises UE-specific scheduling information for the second TTI of the first set of TTIs. In some examples of the method, apparatus, and non-transitory computer-readable medium described above, the common scheduling information comprises one or more of a frequency band of one or more TTIs of the first set of TTIs or a search space associated with the second portion of the scheduling information, and the UE-specific scheduling information comprises one or more of a resource assignment, a feedback process identification, a NDI, or a RV associated with the first TTI of the first set of TTIs.

In some examples of the method, apparatus, and non-transitory computer-readable medium described above, the first portion of the scheduling information comprises first UE-specific scheduling information for two or more TTIs of the first set of TTIs, and the second portion of the scheduling information comprises second UE-specific scheduling information for the first TTI of the first set of TTIs. In some examples of the method, apparatus, and non-transitory computer-readable medium described above, the first UE-specific scheduling information comprises one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information comprises one or more of a resource assignment, a feedback process identification, a new data indicator (NDI), or a redundancy version (RV) associated with the second TTI of the first set of TTIs.

In some examples of the method, apparatus, and non-transitory computer-readable medium described above, the second portion of the scheduling information includes two or more grants for one or more UEs. In some examples of the method, apparatus, and non-transitory computer-readable medium described above, the two or more grants include a first resource grant for a first UE that indicates second TTI resources on the second component carrier, and a second resource grant for a second UE that indicates first TTI resources on the first component carrier, and the first TTI resources may be rate-matched around the first resource grant and the second resource grant. In some examples of the method, apparatus, and non-transitory computer-readable medium described above, the two or more grants may be downlink grants and the first resource grant may be located before the second resource grant in the first TTI of the first set of TTIs. In some examples of the method, apparatus, and non-transitory computer-readable medium described above, the two or more grants may be downlink grants and the first resource grant may be located after the second resource grant in the first TTI of the first set of TTIs. In some examples of the method, apparatus, and non-transitory computer-readable medium described above, the second portion of the scheduling information further includes an indication of a starting location within the first TTI of the first set of TTIs of the second resource grant. In some examples of the method, apparatus, and non-transitory computer-readable medium described above, the first resource grant and second resource grant indicate one or more of a resource assignment, a feedback process identification, a NDI, or a RV.

In some examples of the method, apparatus, and non-transitory computer-readable medium described above, the scheduling information comprises UE-specific scheduling information for two or more UEs and an indication of resources on two or more component carriers for the first set of TTIs. In some examples of the method, apparatus, and non-transitory computer-readable medium described above, the UE-specific scheduling information for the two or more UEs includes a first resource grant for a first UE that indicates first TTI resources on the second component carrier, and a second resource grant for a second UE that indicates first TTI resources on the first component carrier, and the first TTI resources may be rate-matched around the first resource grant and the second resource grant.

DETAILED DESCRIPTION

Figure 1:
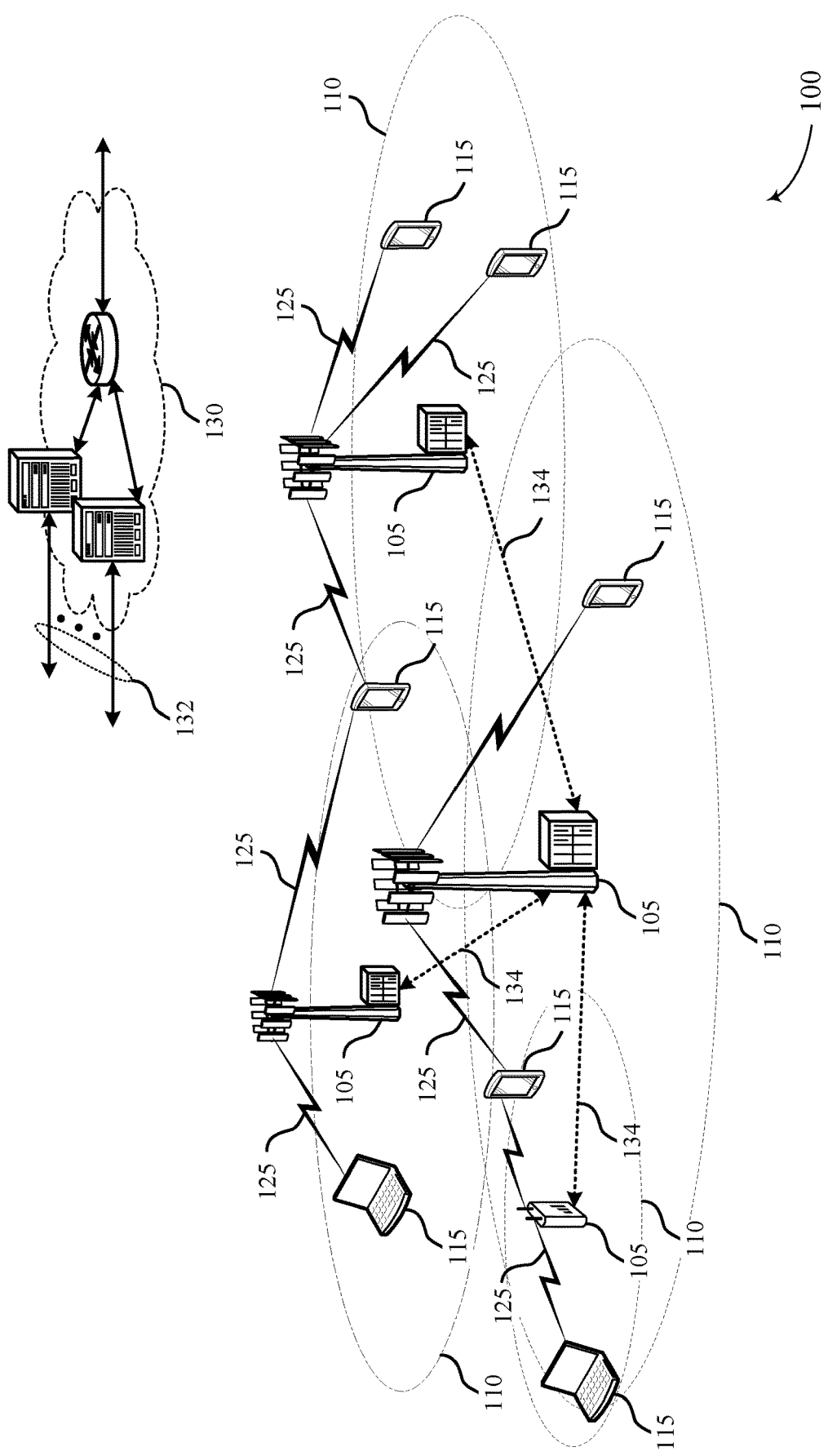
FIG. 1 illustrates an example of a system for wireless communication that supports techniques for cross-carrier scheduling using multiple transmission time interval durations in accordance with aspects of the present disclosure.

Control channels for low latency transmissions may be designed, mapped, and communicated to decrease signaling overhead and to increase the availability of resources for low latency data channels. Data channels using reduced length transmission time intervals (TTIs) (e.g., including a shortened TTI (sTTI)) may encounter a number of challenges, including the need to efficiently support multiple low latency users, support multiple component carrier (CC) scheduling, as well as support legacy users. Downlink control channel information may include resource grants for one or more UEs across one or more CCs, according to techniques as discussed herein.

In some examples, two-stage or two-level grants may provide a slow grant and a fast grant. A slow grant may be provided in only some sTTIs and may include more slowly varying scheduling information, such as a sTTI frequency band, a search space for fast grants, a base modulation and coding scheme (MCS), precoding and/or antenna port information, aggregation levels, or any combination thereof. A fast grant may be provided in each sTTI, and may include more dynamic scheduling information for the particular sTTI, such as resource assignment, Hybrid ARQ (HARQ) process ID, NDI, RV, or any combination thereof. In some cases, a single-level grant may include all scheduling information for a particular sTTI. In some cases, the scheduling information may be provided using a scheduling CC, which may be a primary CC, that includes scheduling information for one or more sTTIs for the scheduling CC and one or more other CCs, for one or more UEs.

Resources allocated for low latency communication may be used for uplink and downlink communication using sTTIs that, as indicated above, have a reduced length relative to TTIs of communications that may be relatively latency insensitive, such as enhanced mobile broadband (eMBB) transmissions that may use a 1 ms TTI duration. Communications using sTTIs may use, in some cases, an sTTI duration that corresponds to one slot of a wireless subframe, or an sTTI duration that corresponds to two or three orthogonal frequency division multiplexing (OFDM) symbols. In some cases, sTTIs may be configured to have boundaries within or aligned with boundaries of a slot of a 1 ms TTI. In some examples, the sTTIs may span two or three OFDM symbols, and each slot may have three sTTIs. In such a manner, all seven symbols of a slot using a normal cyclic prefix may be utilized and system resources may be more efficiently utilized relative to a case where three two-symbol sTTIs would be included in a seven-symbol slot.

Low latency communications using sTTIs may be used in systems, for example, that may support multiple different services for data communications. Different services may be selected depending upon the nature of the communications. For example, communications that require low latency and high reliability, sometimes referred to as mission critical (MiCr) communications, may be served through a lower-latency service (e.g., a ultra-reliable low latency communication (URLLC) service) that uses sTTIs. Correspondingly, communications that are more delay-tolerant may be served through a service that provides relatively higher throughput with somewhat higher latency, such as a mobile broadband service (e.g., an eMBB service) that uses 1 ms TTIs. In other examples, communications may be with UEs that are incorporated into other devices (e.g., meters, vehicles, appliances, machinery, etc.), and a machine-type communication (MTC) service (e.g., massive MTC (mMTC)) may be used for such communications. In some cases, different services (e.g., eMBB, URLLC, mMTC) may have different TTIs, different sub-carrier (or tone) spacing and different cyclic prefixes.

The present disclosure describes various techniques with reference to next generation networks (e.g., 5G or NR networks) that are being designed to support features such as low-latency operations, high bandwidth operations, more dynamic subframe/slot types, and self-contained subframe/slot types (in which HARQ feedback for a subframe/slot may be transmitted before the end of the subframe/slot). However, such techniques may be used for any system in which TTIs of different lengths may be transmitted in a wireless communications system.

Aspects of the disclosure are initially described in the context of a wireless communications system. Resource allocation and search space diagrams are then used to illustrate aspects of the disclosure. Aspects of the disclosure are additionally illustrated by and described with reference to apparatus diagrams, system diagrams, and flowcharts that relate to techniques for cross-carrier scheduling using multiple transmission time interval durations.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE (or LTE-Advanced) network, or a New Radio (NR) network. In some cases, wireless communications system 100 may support enhanced broadband communications, ultra-reliable (i.e., mission critical) communications, low latency communications, and communications with low-cost and low-complexity devices. In some cases, multiple CCs may be used for communications between base stations 105 and UEs 115, and some of all of the scheduling information for two or more CCs may be provided using a scheduling CC.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a TTI of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine-type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some cases, an MTC device may operate using half-duplex (one-way) communications at a reduced peak rate. MTC devices may also be configured to enter a power saving "deep sleep" mode when not engaging in active communications. In some cases, MTC or IoT devices may be designed to support mission critical functions and wireless communications system may be configured to provide ultra-reliable communications for these functions.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may be connected by an S1 interface to the core network 130. The core network may be an evolved packet core (EPC), which may include at least one mobility management entity (MME), at least one S-GW, and at least one P-GW. The MME may be the control node that processes the signaling between the UE 115 and the EPC. All user internet protocol (IP) packets may be transferred through the S-GW, which itself may be connected to the P-GW. The P-GW may provide IP address allocation as well as other functions. The P-GW may be connected to the network operators IP services. The operators IP services may include the Internet, the Intranet, an IP Multimedia Subsystem (IMS), and a Packet-Switched (PS) Streaming Service (PSS).

The core network 130 may provide user authentication, access authorization, tracking, IP connectivity, and other access, routing, or mobility functions. At least some of the network devices may include subcomponents such as an access network entity, which may be an example of an access node controller (ANC). Each access network entity may communicate with a number of UEs 115 through a number of other access network transmission entities, each of which may be an example of a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate in an ultra high frequency (UHF) frequency region using frequency bands from 700 MHz to 2600 MHz (2.6 GHz), although in some cases wireless local area network (WLAN) networks may use frequencies as high as 4 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some cases, wireless communications system 100 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some cases, this may facilitate use of antenna arrays within a UE 115 (e.g., for directional beamforming).

Thus, wireless communications system 100 may support millimeter wave (mmW) communications between UEs 115 and base stations 105. Devices operating in mmW or EHF bands may have multiple antennas to allow beamforming. That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g. a base station 105) to shape and/or steer an overall antenna beam in the direction of a target receiver (e.g. a UE 115). This may be achieved by combining elements in an antenna array in such a way that transmitted signals at particular angles experience constructive interference while others experience destructive interference.

Multiple-input multiple-output (MIMO) wireless communications systems use a transmission scheme between a transmitter (e.g. a base station) and a receiver (e.g. a UE), where both transmitter and receiver are equipped with multiple antennas. Some portions of wireless communications system 100 may use beamforming. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the synchronization signals.

In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may multiple use antennas or antenna arrays to conduct beamforming operations for directional communications with a UE 115.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30,720,000$ seconds). Time resources may be organized according to radio frames of length of 10 ms ($T_f=307200\ T_s$), which may be identified by a system frame number (SFN) ranging from 0 to 1023. Each frame may include ten 1 ms subframes numbered from 0 to 9. A subframe may be further divided into two 0.5 ms slots, each of which contains 6 or 7 modulation symbol periods (depending on the length of the cyclic prefix prepended to each symbol). Excluding the cyclic prefix, each symbol contains 2048 sample periods. In some cases the subframe may be the smallest scheduling unit, also known as a TTI. In other cases, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both frequency division duplexing (FDD) and time division duplexing (TDD) component carriers.

In some cases, wireless communications system 100 may utilize enhanced component carriers (eCCs). An eCC may be characterized by one or more features including: wider bandwidth, shorter symbol duration, shorter transmission time interval (TTIs), and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 Mhz, etc.) at reduced symbol durations (e.g., 16.67 microseconds). A TTI in eCC may consist of one or multiple symbols. In some cases, the TTI duration (that is, the number of symbols in a TTI) may be variable.

In some cases, wireless communications system 100 may utilize both licensed and unlicensed radio frequency spectrum bands. For example, wireless communications system 100 may employ LTE License Assisted Access (LTE-LAA) or LTE Unlicensed (LTE U) radio access technology or NR technology in an unlicensed band such as the 5 Ghz Industrial, Scientific, and Medical (ISM) band. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a carrier aggregation (CA) configuration in conjunction with component carriers (CCs) operating in a licensed band. Operations in unlicensed spectrum may include downlink transmissions, uplink transmissions, or both. Duplexing in unlicensed spectrum may be based on FDD, TDD or a combination of both.

As indicated above, a base station 105 may communicate with one or more of UEs 115 using low latency transmissions, for example using sTTIs. An sTTI may be divided into a number of resource blocks, one or more of which may include a control region. The control region may include downlink grants for one or more a low latency UEs 115 on one or more CCs, and may indicate a data region of the resource block of the one or more CCs for the UE(s) 115 to receive data.

In some examples, a first sTTI may include a control region, for example a sPDCCH, that includes an indication of portions of the sPDCCH that may be reallocated for data transmissions within the first sTTI. The reallocated data region of the first sTTI may be for a PDSCH, for example, transmitted by a base station 105. The control region may include a control message that has grants of downlink and/or uplink resources of the CC(s) for the UE(s) 115. A UE 115 that receives the downlink grant in the sPDCCH may identify the data region of the sTTI, which may include uplink/downlink grants for other UEs 115 or CCs. In some examples, data transmissions within the sPDCCH may be rate matched around the uplink/downlink grants of the sTTI. In some examples, the sPDCCH may include an indication (e.g., a field made up of a number of bits to provide a mapping of a PDSCH data area of the sTTI) to inform the UE 115 of portions of the sTTI for data transmissions.

In addition to downlink grants for multiple UEs 115 and/or CCs, an sPDCCH resource block may include one or more uplink grants for one or more UEs 115 and/or CCs. In some cases, the downlink grants may be at the beginning of the control region, against a first boundary of the control region, and the one or more uplink grants may be at the end of the control region, against a second boundary of the control region. A UE 115 may blindly decode the beginning of the control region according to multiple possible starting locations and aggregation levels to identify a downlink grant. The size of the control region may be large enough so that, for the different possible aggregation levels, uplink grants and the downlink grant do not overlap in the control region. An unused portion of the control region, for example for lower aggregation levels, may be reallocated to the data region. An indication of the start of the uplink grants may be provided in the downlink grant of the control region so that, in conjunction with knowledge by the UE 115 of the end of its downlink grant, UE 115 may identify the data region within the sPDCCH of the sTTI.

In other cases, the downlink grant for a UE 115 may be located at the beginning of the control region, and downlink grants for one or more other CCs or UEs 115 may be located at the end of the control region, and an unused portion of the control region may be reallocated to the data region. An indication of the start of the other downlink grants, and the uplink grants, may be provided in the downlink grant of the control region so that, in conjunction with knowledge by the UE 115 of the end of its downlink grant, UE 115 may identify the data region within the sPDCCH of the sTTI.

Figure 2:
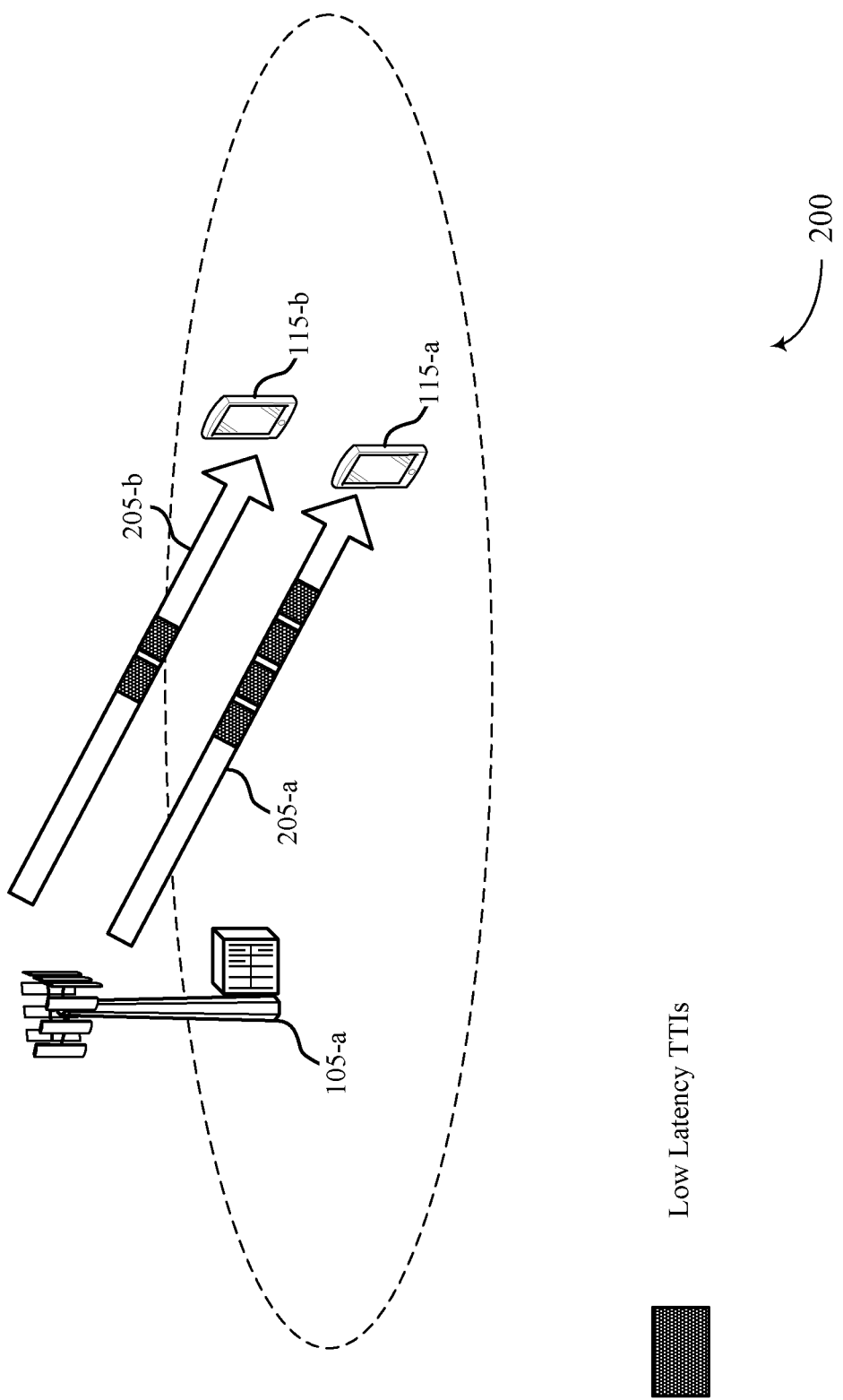
FIG. 2 illustrates an example of a wireless communications system that supports techniques for cross-carrier scheduling using multiple transmission time interval durations in accordance with aspects of the present disclosure.

FIG. 2 illustrates an example of a wireless communications system 200 that supports techniques for cross-carrier scheduling using multiple transmission time interval durations. Wireless communications system 200 includes one or more base stations 105-a, a first UE 115-a, and a second UE 115-b, which may be examples of aspects of a base station 105 and a UE 115 as described with reference to FIG. 1. Base station 105-a may transmit resource allocations and other control information in one or more sPDCCH transmissions to UEs 115. The resource allocations may include one or both of downlink grants and uplink grants of resources for transmission of downlink data (e.g., in an sPDSCH) and uplink data (e.g., in a sPUSCH) for UEs 115. Wireless communications system 200 may support carrier aggregation, and a first CC 205-a and a second CC 205-b may be transmitted to one or both of the first UE 115-a and the second UE 115-b. In some examples, all or a portion of scheduling information for each CC 205 may be transmitted on the first CC 205-a, which may be a scheduling CC or primary CC.

An sTTI for low latency communications may have multiple resource blocks, which may span the whole system bandwidth or a portion of the system bandwidth. The resource blocks may have the same or different sizes in frequency. Each resource block may be allocated for a single user or multiple users. The users may access one, multiple, or all of the resource blocks of the sTTI, depending on a configuration. The resource block structure used may be defined by higher level signaling, for example for a semi-static configuration.

A resource block may have an sPDCCH associated with the resource block. The sPDCCH may be embedded in the resource block. The sPDCCH may be at the beginning of the resource block (e.g., in the first one or more symbols of the resource block) to enable early decoding of the sPDCCH in the resource block. The sPDCCH may span the bandwidth of the resource block, or may occupy less than the full bandwidth of the resource block, with additional signaling included above (e.g., at a higher frequency) and/or below (e.g., at a lower frequency) the resource elements occupied by the sPDCCH in the resource block.

In some cases, an sPDCCH may allocate an sPDSCH for a low latency user to a resource block that has already been allocated to a PDSCH for some other users (e.g., legacy users) in a TTI. The TTI may overlap in whole or in part with at least one sTTI. That is, a PDSCH allocation of a TTI may overlap in whole or in part with a resource block of an sTTI. A transmission with a PDCCH (e.g., which may be referred to as a legacy or regular PDCCH) for a TTI may include an indication of the PDSCH resource allocation within the TTI. For example, a PDSCH indicated by the PDCCH may be allocated to a set of frequency resources. A low latency user may be configured to monitor for such PDCCHs (e.g., receive and decode legacy PDCCHs) in addition to sPDCCHs. The low latency user may thus receive and decode the indication in the PDCCH and identify the PDSCH resource allocation.

The low latency user may also receive an sPDCCH identifying an sPDSCH of a resource block of an sTTI for the low latency user, the resource block also including the regular or legacy PDSCH resource allocation. The low latency user, having received the indication for the PDSCH, may determine a location of the PDSCH within the sTTI on one or more CCs. Based on the indication, the low latency user may then determine that the sPDSCH associated with the sPDCCH that the low latency user has received, for example based on a downlink grant in the sPDCCH, is frequency division multiplexed with the regular or legacy PDSCH.

In some cases, an sPDCCH for one resource block within an sTTI for a user may include one or more downlink grants or uplink grants for one or more additional CCs or other UEs 115. For example, as described above, the sPDCCH may be in the first portion of the sTTI block (e.g., in the first symbol of the sTTI) at a predefined location within the resource block of the sTTI. A low latency user may monitor the control region (e.g., the sPDCCH) for each sTTI resource blocks to determine whether a downlink grant of resources has been sent (e.g., from a serving base station 105-a) in the sPDCCH to the low latency user. A low latency user may search for both uplink and downlink grants in the sPDCCH. In some examples, a two stage grant for the low latency user may be used, where the first stage grant, received in messaging sent during a time interval prior to the sTTI, specifies more slowly varying information for transmissions, such as an aggregation level associated with the resource blocks of the sTTI.

By providing cross-carrier scheduling for carrier aggregation operation, inter-cell interference that may be present in some deployments (e.g., for heterogeneous networks) may be managed. For example, cross-carrier scheduling enables the UEs 115 to receive the sPDCCH targeted for one CC (e.g., the second CC 205-b) on another CC (e.g., the first CC 205-a). In such a manner, inter-cell interference from other transmitters on one or more secondary CCs may have reduced impact on transmission of scheduling information. As discussed above, in some cases, two-stage sTTI scheduling may be used. In some examples, both slow and fast grants may be transmitted using the scheduling CC or first CC 205-a. In other examples, only the slow grant may be transmitted using the scheduling CC or first CC 205-a, and the fast grant may be transmitted using the second CC 205-b (or scheduled CC). Also, as discussed above, some deployments may use only a single-level scheduling technique. In cases where both the fast and slow grants are transmitted using the scheduling CC, or in cases where a single-level scheduling transmission is transmitted using the scheduling CC, two or more grants may be included in a resource block of the scheduling CC. In such cases, various rate-matching techniques are provided to allow some sPDSCH transmissions to be included with the sPDCCH transmissions in cases, where some of the sPDCCH resources may be available.

Figure 3:
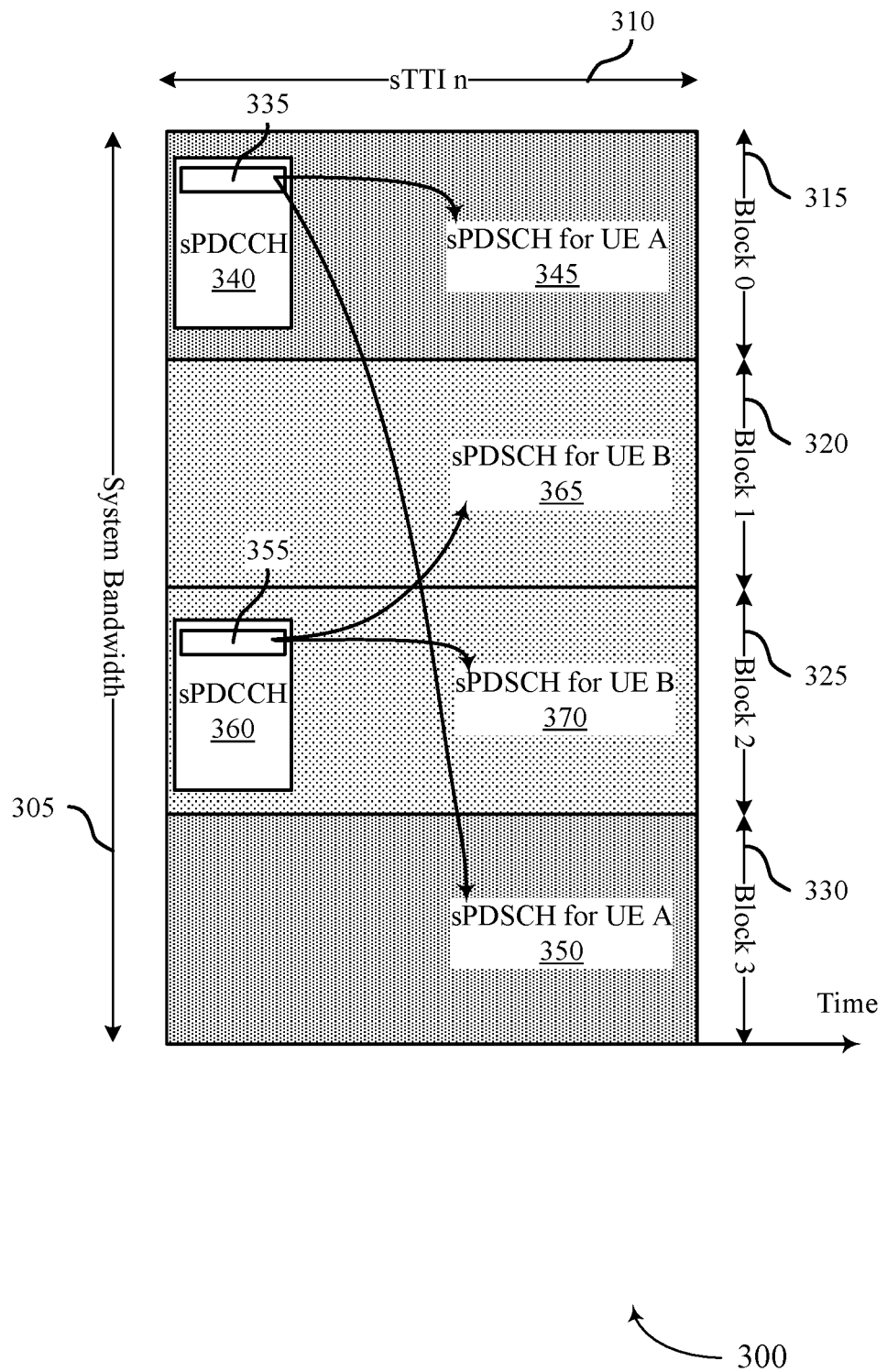
FIGS. 3 through 4 illustrate examples of resource allocation diagrams that support techniques for cross-carrier scheduling using multiple transmission time interval durations in accordance with aspects of the present disclosure.

FIG. 3 illustrates an example of a resource allocation diagram 300 that supports techniques for cross-carrier scheduling using multiple transmission time interval durations. Resource allocation diagram 300 includes one of sTTI 310 having a system bandwidth 305. sTTI 310 may represent a sTTI within a legacy TTI, or a separate TTI. In some examples, and as may be the case with other sTTI described here, sTTI 310 may be of different durations, for example a single symbol period, two symbol periods, a single slot width associated with a legacy TTI, etc. In this example, sTTI 310 includes four resource blocks: resource block 315 and resource block 330 for UE A, and resource block 320 and resource block 325 for UE B.

A base station 105 may generate a downlink grant 335 to be included in an sPDCCH 340, the control region of resource block 315. The sPDCCH 340 may be, for example, in a first symbol period of the resource block 315. The downlink grant 335 may be for an sPDSCH 345 in a data region of the resource block 315 that contains the downlink grant. The downlink grant may also be for a second sPDSCH, sPDSCH 350, in a data region of resource block 330 that are also for UE A, to be jointly used to receive data at UE A based on the control information of downlink grant 335.

A base station 105 may also generate a second downlink grant 355 to be included in an sPDCCH 360, the control region of resource block 325. The downlink grant 355 may be for the sPDSCH 370 of the resource block 325, and may also be for the sPDSCH for resource block 320. While resource blocks 315 through 325 are described with respect to a single component carrier, one or more downlink grants may be provided for one or more other CCs, as discussed in more detail below.

For both downlink grants, one or more bits in each of downlink grant 335 and downlink grant 355 may be generated by a transmitting based station 105 to indicate other resource blocks of the sTTI that include an sPDSCH for that same low latency user. In this example, sTTI 310 includes four resource blocks. Downlink grant 335 for a UE A may thus include three bits to indicate whether the downlink grant 335 is for any of the other three resource blocks for UE A.

In one example, the bits of the indication may make up or be a part of a resource allocation field in the downlink grant 335. In other examples, the bits of the indication may be included at another position in an sPDCCH, such as sPDCCH 340, or elsewhere within the control region of a resource block, such as resource block 315. The first bit of the indication may be associated with resource block 320, the second bit may be associated with resource block 325, and the third bit may be associated with resource block 330. The receiving UEs, UE A and UE B may infer the relationship between the bits and the resource blocks. For example, the first bit may be associated with the first resource block of the sTTI 310 that does not contain the downlink grant having the bits of the indication, and so on. In the example shown in resource allocation diagram 300 for sTTI 310, in downlink grant 335 the third bit of the indication identifies the fourth resource block 330 as for UE A. In downlink grant 355, the second bit of the indication identifies the second resource block 320 as for UE B.

The above-described procedure may efficiently indicate downlink grants at least in part because a low latency user may only need to perform a blind decode in a fixed position of the sPDCCH within the resource block, and a number of blind decodes used to determine the downlink grant may be limited to a number of resource blocks configured by a base station (e.g., cell) in the sTTI. Furthermore, the maximum number of bits in the indication of the downlink grant may also be limited to the number of resource blocks of the sTTI minus one.

Figure 4:
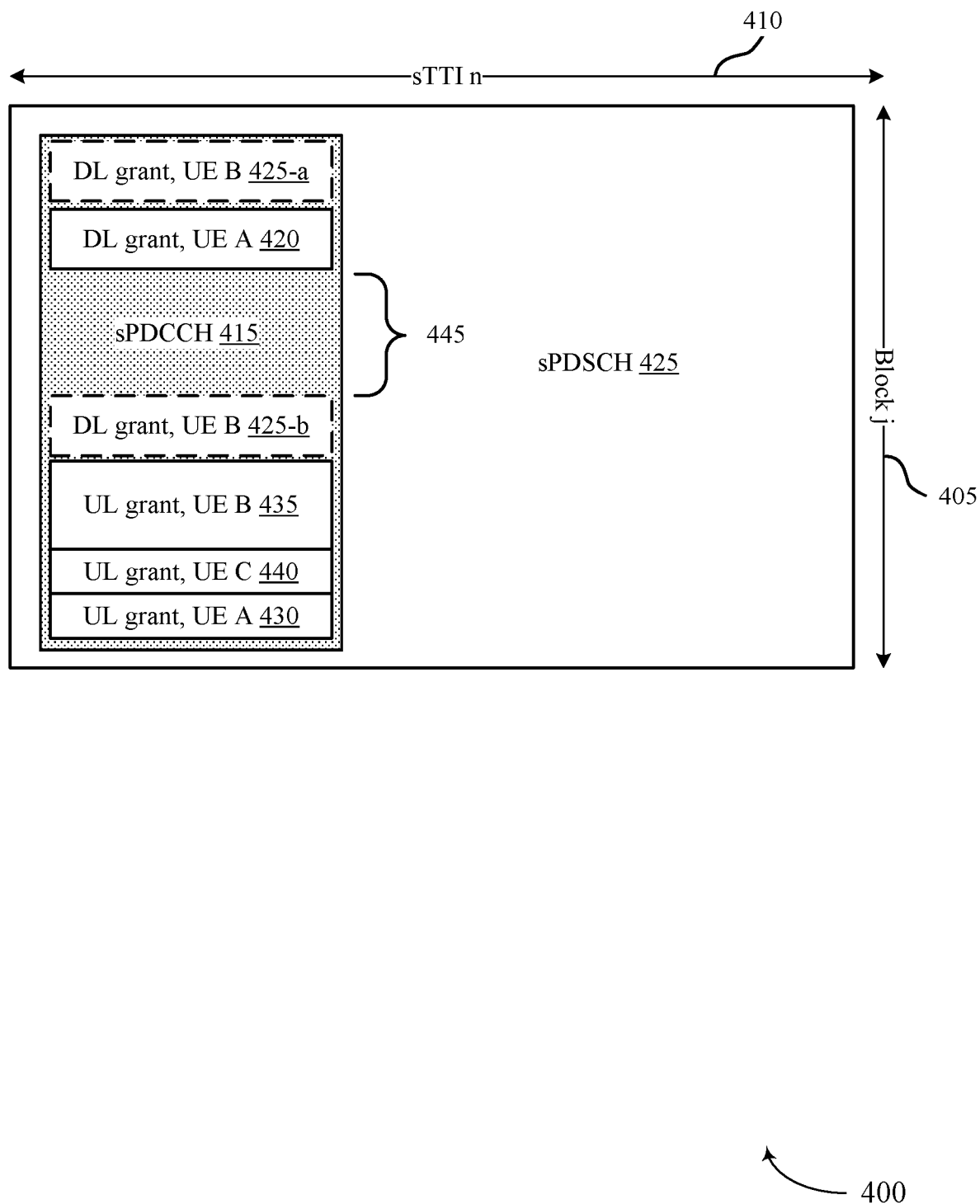

FIG. 4 illustrates an example of a resource allocation diagram 400 that supports techniques for cross-carrier scheduling using multiple transmission time interval durations. Resource allocation diagram 400 shows a resource block 405 for a sTTI 410, where the resource block 405 includes a control region including sPDCCH 415 and a data region including sPDSCH 425 for UE-A that is indicated by sPDCCH 415. sPDCCH 415 may be or include one or more aspects of sPDCCH 340 or sPDCCH 360. sPDCCH 415 includes at least one downlink grant 420 for a UE-A, and at least one downlink grant 425 for UE-B (or one or more other UEs) on one or more CCs. In some cases, a downlink grant 425-a for UE-B (on a same or different CC) may be located at a beginning of the sPDCCH 415, ahead of the downlink grant 420 for UE-A. In other examples, downlink grant 425-b for UE-B (on a same or different CC) may be after the downlink grant 420 for UE-A but ahead of one or more uplink grants 430 through 440. Some examples of an sPDCCH 415 may include one more uplink grants for one or more UEs, which may also include an uplink grant 430 for UE-A. The example of resource allocation diagram 400 includes uplink grant 430 for UE-A, uplink grant 435 for UE-B, uplink grant 440 for UE-C, in which the uplink grant 435 for UE-B and the uplink grant 440 for UE-C may be on a same or different CC. In other examples, one or more downlink or uplink grants may be provided for UE-A for a different CC.

In examples where a downlink grant 420 for UE-A may be at the beginning of the control region, sPDCCH 415, such a grant may be positioned at a first boundary of the sPDCCH 415 control region. The uplink grants, and any downlink grants for other CCs and/or UEs may be clustered at the end of the control region, sPDCCH 415. The uplink/downlink grants may be transmitted by a base station 105 in sPDCCH 415 of resource block 405 according to one of multiple different aggregation levels. In some examples, the aggregation level for UE-A may have been indicated in a previously transmitted grant from base station 105. For example, a two-stage grant configuration may be used, such that the first grant in a previous transmission (e.g., a previous sTTI or TTI, such as a PDCCH in a previously-received TTI) may include the aggregation level for UE-A, and the second grant may be the downlink grant 420. In such examples, the downlink grant 425-b, the uplink grant 430, uplink grant 435, and uplink grant 440 may be at the end of sPDCCH 415, with the uplink grant 430 for UE-A at the end of sPDCCH 415 and located at a position at a second boundary of the sPDCCH 415 control region. Each of the downlink grant 425-b, uplink grant 435 and uplink grant 440 may be at positions adjacent the uplink grant 430 for UE-A. A size of sPDCCH 415 may be large enough such that for any aggregation level, the downlink grant 420, downlink grant 425, and multiple uplink grants do not overlap if the downlink grant 420 is at the beginning of sPDCCH 415 and the uplink grants are positioned at the end of sPDCCH 415.

The configuration of downlink grants at the beginning of sPDCCH 415 and uplink grants at the end of sPDCCH 415, may reduce the number of blind decode attempts for a UE. For example, one downlink grant for a UE may be at the beginning of sPDCCH 415. If an attempted blind decode at the beginning of sPDCCH is unsuccessful, the UE knows that the sPDSCH 425 is not for that UE.

In other configurations, the downlink grant 420 for UE-A may be located behind one or more other downlink grants for one or more other CCs, which may be for UE-A or other UE(s). In such cases, each UE may perform a blind decode at its identified aggregation level to determine if the downlink grant is for the UE. When a blind decode for a downlink grant that is not at the beginning of the sPDCCH 415, the UE knows that one or more prior grants are included that are not intended for that UE and that an end of the successfully decoded downlink grant is the last portion of the sPDCCH 415 that has downlink grants.

As illustrated in resource allocation diagram 400, a portion (sPDSCH 445) of the control region for sPDCCH 415 may be reallocated to be a part of data region for sPDSCH 425, recapturing unused control overhead from sPDCCH 415. Thus, reallocated sPDSCH 445 may be relocated from a portion of the sPDCCH 415. The size of reallocated sPDSCH 445 may depend in part on the aggregation level. The resources of sPDCCH 415 that are to be used for reallocated sPDSCH 445 may be signaled in the downlink grant 420. In particular, an indication may identify the start of one or more uplink/downlink grants within the sPDCCH 415. In some examples, the indication may be rate matching information field, as further described below.

Figure 5:
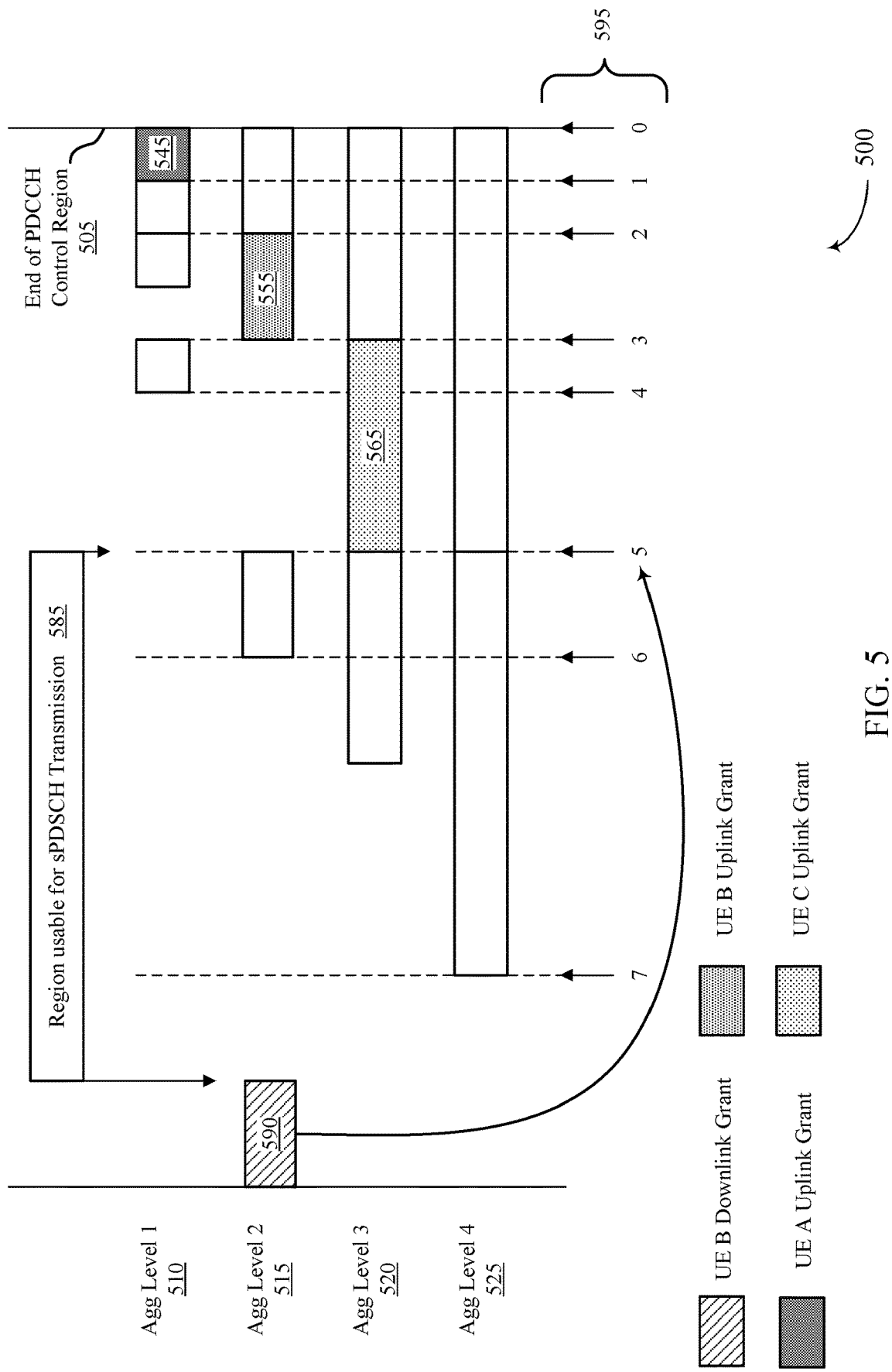
FIGS. 5 through 7 illustrate examples of uplink search spaces that supports techniques for cross-carrier scheduling using multiple transmission time interval durations in accordance with aspects of the present disclosure.

FIG. 5 illustrates an example of a search space 500 that supports techniques for cross-carrier scheduling using multiple transmission time interval durations. The search space 600 may represent a search space for an sPDCCH that may be or include one or more aspects of sPDCCH 340, sPDCCH 360, or sPDCCH 415. The search space 500 is shown for four aggregation levels, including a first aggregation level 510, a second aggregation level 515, a third aggregation level 520, and a fourth aggregation level 525. As described above, the uplink grants, and one or more other downlink grants, may be positioned at a boundary 505 (e.g., the end) of an sPDCCH control region. An uplink grant for UE-A may be transmitted at first aggregation level 510, an uplink grant for UE-B may be transmitted at second aggregation level 515, and an uplink grant for UE-C may be transmitted at third aggregation level 520.

As described above, an indication may identify the start of the uplink grant region, which may include uplink grant 545 for UE-A, uplink grant 555 for UE-B, and uplink grant 565 for UE C. The indication may be a rate matching information field in a downlink grant, for example downlink grant 590 for UE-B transmitted at a second aggregation level 515. As illustrated for uplink search space 500, the indication may be three bits to identify one of eight different positions 595. In this example, downlink grant 590 for UE-B is transmitted at a second aggregation level 515 and includes an indication of "5" to indicate that the start of the uplink grant region is at "5" position of positions 595. UE-B, having received its downlink grant 590, may then understand that the region 585 of the sPDCCH control region between the end of the downlink grant 590 for UE-B and the "5" position of positions 595.

In other implementations, a greater or fewer number of positions for the start of the downlink and/or uplink grants may be indicated in the downlink grant. A greater number of positions 595 may be indicated by adding one or more bits, for example by increasing the size of the rate matching information field to four or more bits. Increasing the number of positions 595 may increase scheduling flexibility, but may also increase overhead. Similarly, a smaller number of positions 595 may be indicated (e.g., four positions using two bits in the downlink grant), decreasing flexibility, but also decreasing overhead.

Figure 6:
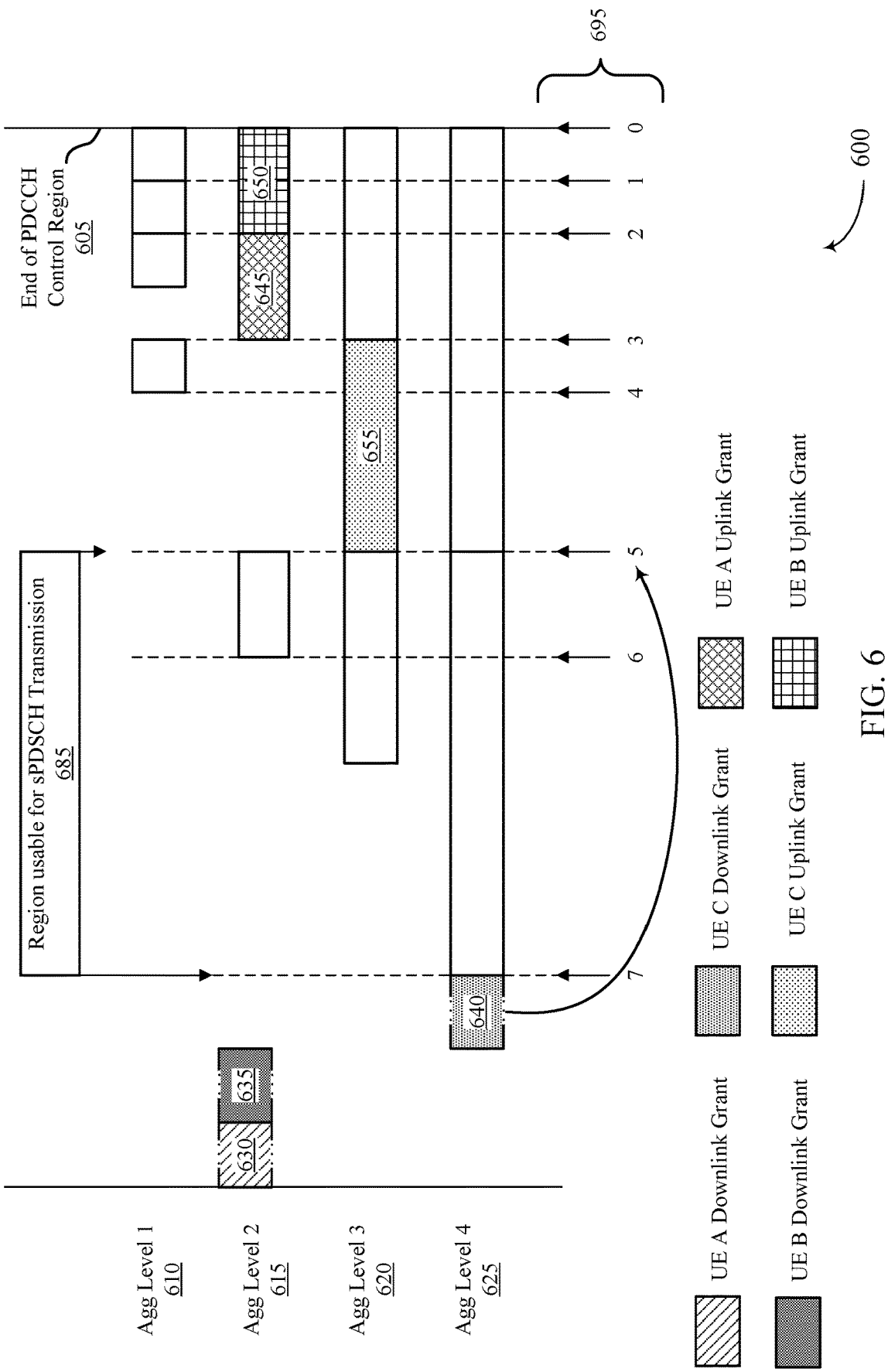

As discussed above, in cases where a fast grant of a two-state grant, or a single stage grant, for a CC other than the scheduling CC is included on the scheduling CC, one or more downlink/uplink grants for the other CC(s) may be included in a sPDCCH transmission. Rate matching in such situations may be accomplished, in some examples, based on a location of a downlink grant for the scheduling CC, based on a rate-matching information field, or combinations thereof. FIG. 6 illustrates an example of a search space 600 that supports for techniques for cross-carrier scheduling using multiple transmission time interval durations.

The search space 600 may represent a search space for an sPDCCH that may be or include one or more aspects of sPDCCH 340, sPDCCH 360, or sPDCCH 415. The search space 600 is, similarly as in FIG. 5, shown for four aggregation levels, including a first aggregation level 610, a second aggregation level 615, a third aggregation level 620, and a fourth aggregation level 625. In this example, the uplink grants may be positioned at a boundary 605 (e.g., the end) of an sPDCCH control region, similarly as discussed in FIG. 5. A downlink grant 630 for UE-A may be transmitted at second aggregation level 615, a downlink grant 635 for UE-B may be transmitted at second aggregation level 615, and a downlink grant 640 for UE-C may be transmitted at fourth aggregation level 625. In this example, the PDSCH transmission for the sTTI and scheduling CC may also be for UE-C.

As described above, an indication provided in the downlink grant 640 for UE-C may identify the start of the uplink grant region, which may include uplink grant 645 for UE-A, uplink grant 650 for UE-B, and uplink grant 655 for UE C. The indication may be a rate matching information field in a downlink grant, for example downlink grant 640 for UE-C. As illustrated for uplink search space 600, the indication may be three bits to identify one of eight different positions 695. In this example, downlink grant 640 for UE-C may include an indication of "5" to indicate that the start of the uplink grant region is at "5" position of positions 695. UE-C may perform blind decoding for potential locations of its downlink grant (at aggregation level 4 in this example), and once it detects its downlink grant 640 may identify the region 685 of the sPDCCH control region between the end of the downlink grant 640 for UE-B and the "5" position of positions 695. In this example, the downlink grant 640 for UE-C is located after downlink grants 630 and 635, and thus an initial blind decode at aggregation level 4 for UE-C will be unsuccessful, which may indicate to UE-C that one or more other downlink grants are located in front of the downlink grant 640 for UE-C, and that an end of the successfully decoded downlink grant 640 identifies the last portion of the sPDCCH 415 that has downlink grants, and identify the region 685.

In other implementations, a greater or fewer number of positions for the start of the uplink grants may be indicated in the downlink grant. A greater number of positions 695 may be indicated by adding one or more bits, for example by increasing the size of the rate matching information field to four or more bits. Increasing the number of positions 695 may increase scheduling flexibility, but may also increase overhead. Similarly, a smaller number of positions 695 may be indicated (e.g., four positions using two bits in the downlink grant), decreasing flexibility, but also decreasing overhead.

Figure 7:
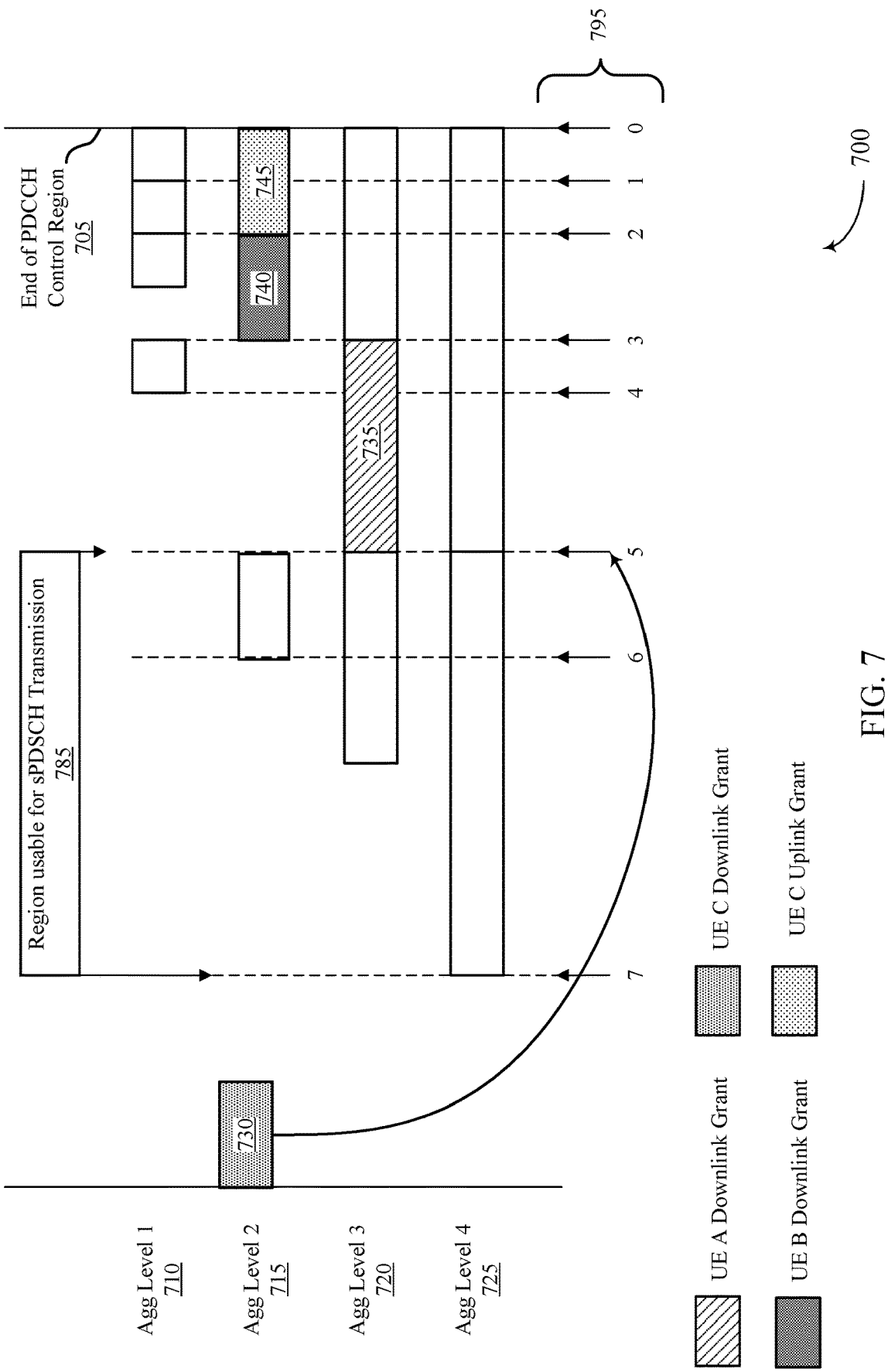

FIG. 7 illustrates another example of a search space 700 that supports techniques for cross-carrier scheduling using multiple transmission time interval durations, in which the rate-matching field may indicate a starting location of one or more downlink grants for other CCs, in addition to one or more uplink grants (for same or different UEs/CCs).

The search space 700 may represent a search space for an sPDCCH that may be or include one or more aspects of sPDCCH 340, sPDCCH 360, or sPDCCH 415. The search space 700 is, similarly as in FIGS. 5 and 6, shown for four aggregation levels, including a first aggregation level 710, a second aggregation level 715, a third aggregation level 720, and a fourth aggregation level 725. In this example, again, the uplink grants may be positioned at a boundary 705 (e.g., the end) of an sPDCCH control region. A downlink grant 730 for UE-C may be transmitted at second aggregation level 715. The downlink grant 730 may include a rate matching information field that indicates a start of a downlink grant 735 for UE-A, and a downlink grant 740 for UE-B. Uplink grant 745 for UE-c, and/or one or more other uplink grants, may follow the downlink grants and be located closer to the boundary 705 than the downlink grants. In this example, the PDSCH transmission for the sTTI and scheduling CC may also be for UE-C.

As described above, an indication provided in the downlink grant 730 for UE-C may identify the start of the downlink/uplink grant region. The indication may be a rate matching information field in the downlink grant. As illustrated for uplink search space 700, the indication may be three bits to identify one of eight different positions 795. In this example, downlink grant 730 for UE-C may include an indication of "5" to indicate that the start of the uplink grant region is at "5" position of positions 795. Once the UE-C detects its downlink grant 630, it may identify the region 685 of the PDCCH control region between the end of the downlink grant 630 for UE-C and the "5" position of positions 695.

In other implementations, a greater or fewer number of positions for the start of the downlink and/or uplink grants may be indicated in the downlink grant. A greater number of positions 795 may be indicated by adding one or more bits, for example by increasing the size of the rate matching information field to four or more bits. Increasing the number of positions 795 may increase scheduling flexibility, but may also increase overhead. Similarly, a smaller number of positions 795 may be indicated (e.g., four positions using two bits in the downlink grant), decreasing flexibility, but also decreasing overhead.

Figure 8:
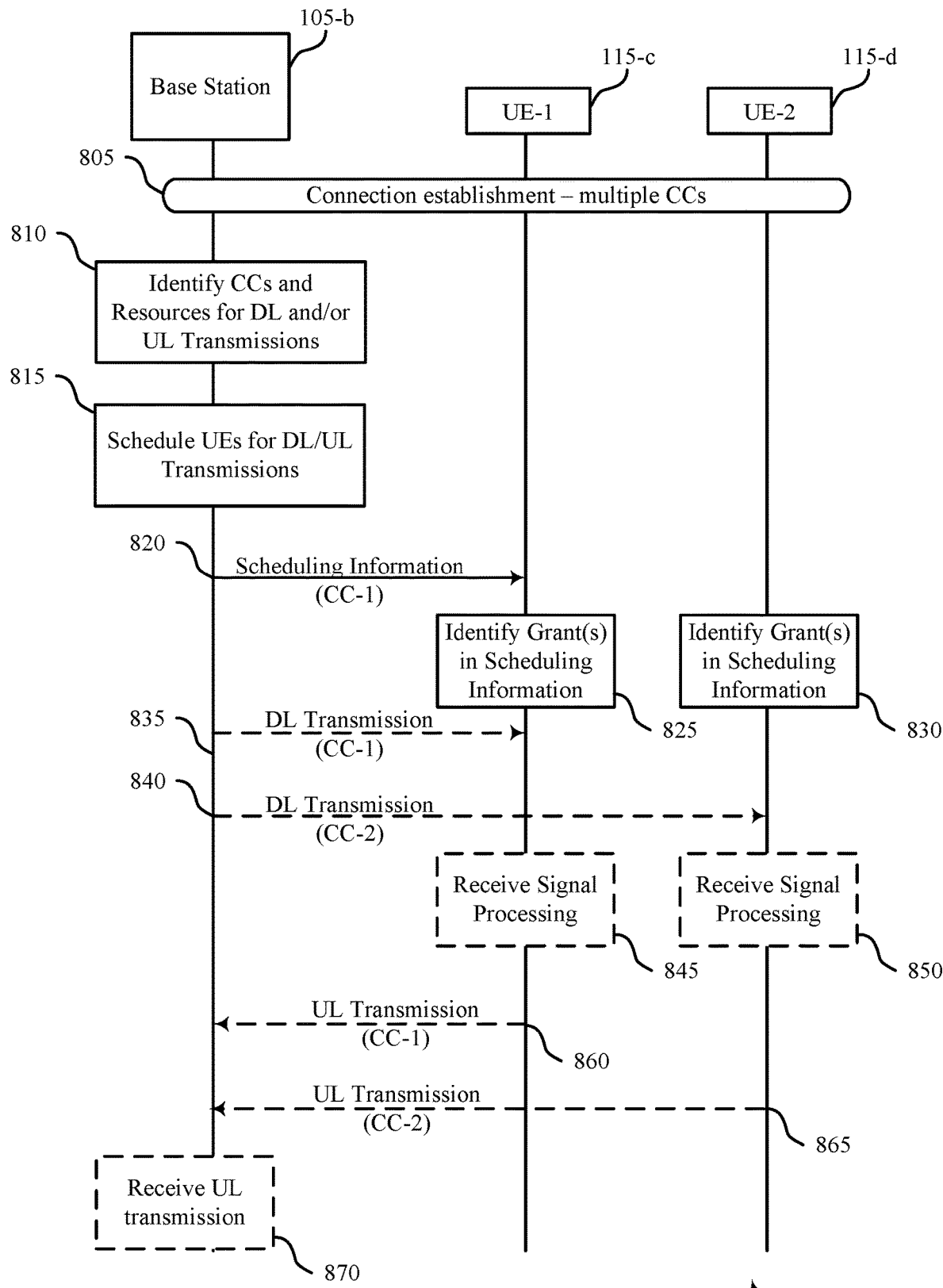
FIG. 8 illustrates an example of a process flow that supports techniques for cross-carrier scheduling using multiple transmission time interval durations in accordance with aspects of the present disclosure.

FIG. 8 illustrates an example of a process flow 800 for cross-carrier scheduling using multiple transmission time interval durations. Process flow 800 may include a base station 105-*b*, a first UE 115-*c*, and a second UE 115-*d*, which may be examples of the corresponding devices described with reference to FIGS. 1 and 2. The base station 105-*b* and the first UE 115-*c* and the second UE 115-*d* may establish a connection 805 according to established connection establishment techniques for the wireless communications system. In some examples, one or both of the UEs 115 may be configured with two or more CCs, with a primary CC being a scheduling CC that is used to transmit some or all of the scheduling information to the UEs for one or more sTTIs on each CC.

At block 810, base station 105-*b* may identify CCs and resources for downlink and/or uplink transmissions between the UEs 115 and the base station 105-*a*. The CCs and resources may be identified based on sTTI resources available and low latency services being used by the UEs 115, for example, and CCs that may be configured for sTTI transmissions. In some cases, the base station 105-*b* may reallocate resources to sTTI transmissions, or away from sTTI transmissions, based on current traffic conditions and may use such allocations to identify CCs and available sTTI resources.

At block 815, the base station 105-*b* may schedule UEs 115 for uplink/downlink transmissions. In some cases, the base station 105-*b* may identify an amount of data to be transmitted using sTTIs, based on a buffer status of low latency data to be transmitted to the UEs 115, based on a buffer status report provided by UEs 115, or combinations thereof. The base station 105-*a* may then allocate and schedule resources of one or more CCs based on the low latency data to be transmitted and the available sTTIs of the one or more CCs. The base station 105-*b* may transmit the scheduling information in a first CC transmission 820.

At block 825, the first UE 115-*c* may identify grant(s) and scheduling information. In some cases, the first UE 115-*c* may identify grants on two or more CCs. The grants may be two-stage grants or one-stage grants, such as discussed above. In some cases, the first UE 115-*c* may identify the grants that are included in a sPDCCH transmission, based on a search space for identifying grants such as discussed above with respect to FIGS. 3-7. Similarly, at block 830 the second UE 115-*d* may identify grant(s) and scheduling information. The second UE 115-*d* also may identify grants on two or more CCs in a similar manner as discussed with respect to the first UE 115-*c*.

The base station 105-*c* may transmit a first downlink transmission 835 to the first UE 115-*c*, using a first CC. The first downlink transmission may be transmitted, for example, using a sTTI. In some cases, the first downlink transmission may be transmitted using sPDSCH resources, or sPDCCH resources that are reallocated for shared channel transmissions, as discussed above with respect to FIGS. 3-7.

The base station 105-*c* may transmit a second downlink transmission 840 to the second UE 115-*d*, using a second CC. The second downlink transmission may be transmitted, for example, using a sTTI. In some cases, the second downlink transmission may be transmitted using sPDSCH resources on a different CC than was used to transmit scheduling information 820, as discussed above with respect to FIGS. 3-7.

At block 845, the first UE 115-*c* may perform receive signal processing, such as demodulating and decoding a downlink transmission. In some cases, receive signal processing may include performing feedback processing, such as HARQ processing, on the downlink transmission. At block 850, the second UE 115-*d* may perform receive signal processing, similarly as performed by the first UE 115-*c*.

The UE 115-*c* may transmit a first uplink transmission 860 to the base station 105-*c*, using the first CC. The first uplink transmission may be transmitted, for example, using a sTTI. In some cases, the first uplink transmission may be transmitted using resources allocated in an uplink grant transmitted in the scheduling information of 820 on CC-1, and identified at 825.

The UE 115-*d* may transmit a second UL transmission 865 to the base station 105-*c*, using a second CC. The second uplink transmission may be transmitted, for example, using a sTTI. In some cases, the second downlink transmission may be transmitted using resources allocated in an uplink grant transmitted in the scheduling information of 820 on CC-1, and identified at 830.

At block 870, the base station 105-*c* may perform receive signal processing, such as demodulating and decoding an uplink transmission 860 or uplink transmission 865.

Figure 9:
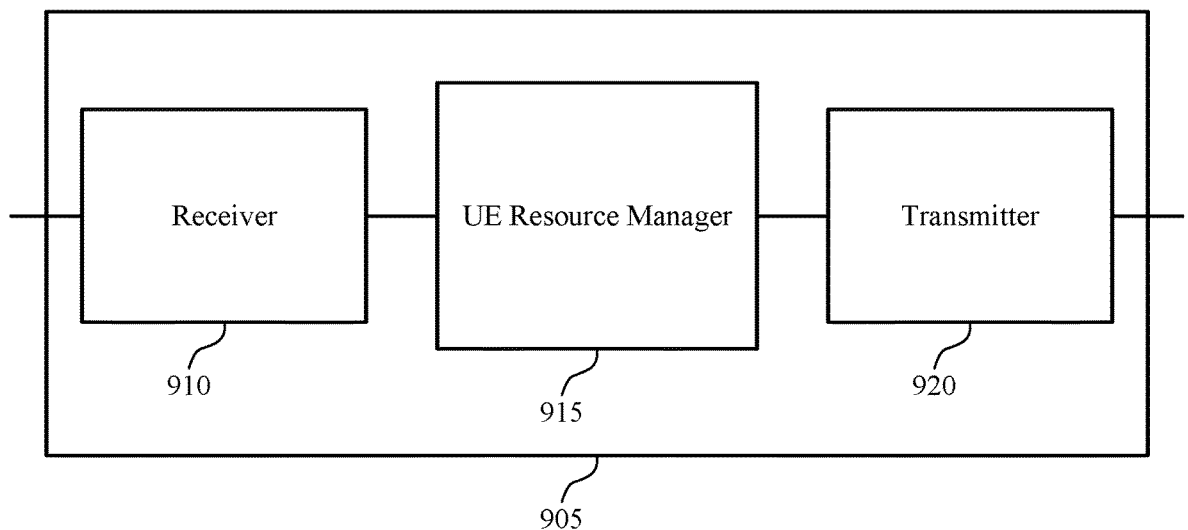
FIGS. 9 through 11 show diagrams of a device that supports techniques for cross-carrier scheduling using multiple transmission time interval durations in accordance with aspects of the present disclosure.

FIG. 9 shows a diagram 900 of a wireless device 905 that supports techniques for cross-carrier scheduling using multiple transmission time interval durations in accordance with various aspects of the present disclosure. Wireless device 905 may be an example of aspects of a user equipment (UE) 115 as described with reference to FIGS. 1, 2, and 8. Wireless device 905 may include receiver 910, UE resource manager 915, and transmitter 920. Wireless device 905 may also include a processor. Each of these components may be in communication with one another (e.g., via one or more buses).

Receiver 910 may receive information such as packets, user data, or control information associated with various information channels (e.g., control channels, data channels, and information related to techniques for cross-carrier scheduling using multiple transmission time interval durations, etc.). Information may be passed on to other components of the device. The receiver 910 may be an example of aspects of the transceiver 1235 described with reference to FIG. 12.

UE resource manager 915 may be an example of aspects of the UE resource manager 1215 described with reference to FIG. 12.

UE resource manager 915 and/or at least some of its various sub-components may be implemented in hardware, software executed by a processor, firmware, or any combination thereof. If implemented in software executed by a processor, the functions of the UE resource manager 915 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The UE resource manager 915 and/or at least some of its various sub-components may be physically located at various positions, including being distributed such that portions of functions are implemented at different physical locations by one or more physical devices. In some examples, UE resource manager 915 and/or at least some of its various sub-components may be a separate and distinct component in accordance with various aspects of the present disclosure. In other examples, UE resource manager 915 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE resource manager 915 may identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, receive, over the first component carrier, scheduling information for the second component carrier, the scheduling information indicating resources for transmissions over at least a subset of the first set of TTIs, and receive a downlink transmission over the second component carrier based on the scheduling information or transmit an uplink transmission over the second component carrier based on the scheduling information.

Transmitter 920 may transmit signals generated by other components of the device. In some examples, the transmitter 920 may be collocated with a receiver 910 in a transceiver module. For example, the transmitter 920 may be an example of aspects of the transceiver 1235 described with reference to FIG. 12. The transmitter 920 may include a single antenna, or it may include a set of antennas.

Figure 10:
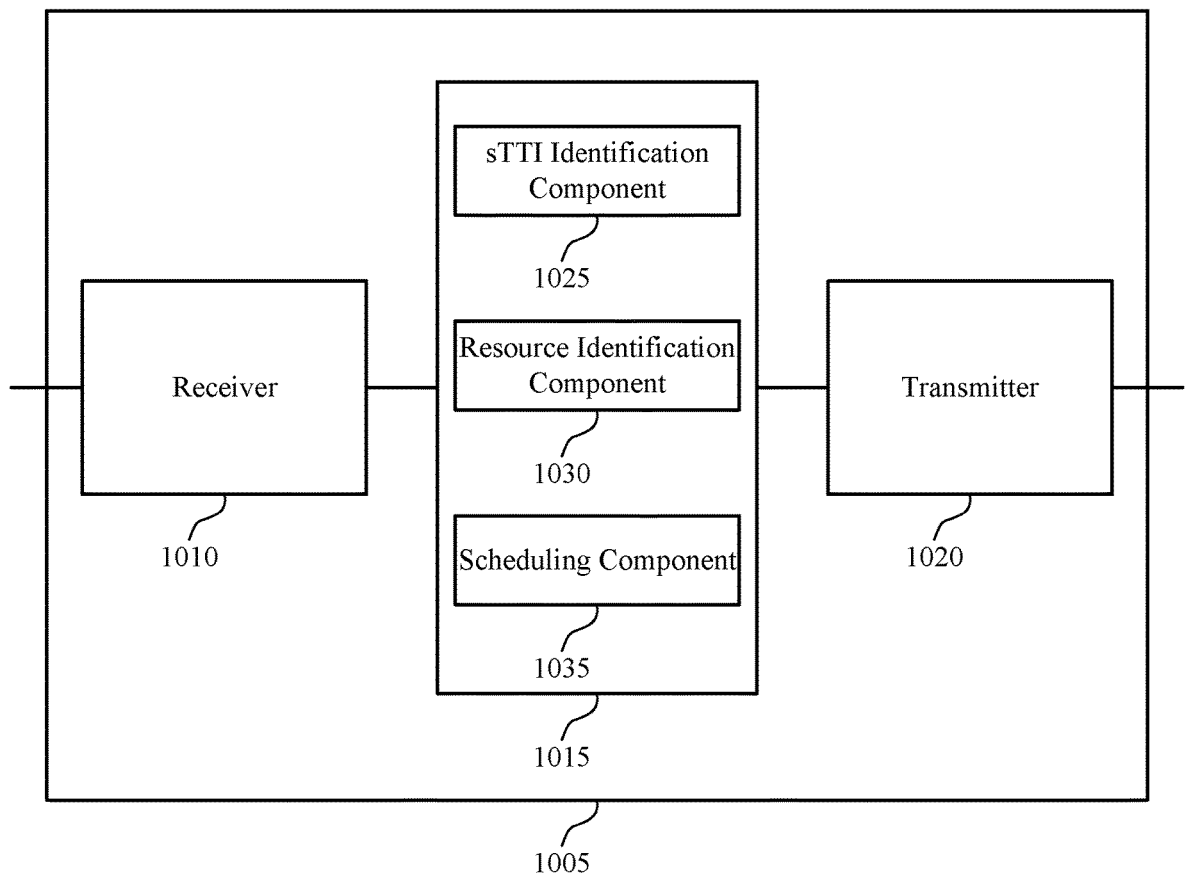

FIG. 10 shows a diagram 1000 of a wireless device 1005 that supports techniques for cross-carrier scheduling using multiple transmission time interval durations in accordance with various aspects of the present disclosure. Wireless device 1005 may be an example of aspects of a wireless device 905 or a UE 115 as described with reference to FIGS. 1, 8, and 9. Wireless device 1005 may include receiver 1010, UE resource manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to techniques for cross-carrier scheduling using multiple transmission time interval durations, etc.). Information may be passed on to other components of the device. The receiver 1010 may be an example of aspects of the transceiver 1235 described with reference to FIG. 12.

UE resource manager 1015 may be an example of aspects of the UE resource manager 1215 described with reference to FIG. 12. UE resource manager 1015 may also include sTTI identification component 1025, resource identification component 1030, and scheduling component 1035.

The sTTI identification component 1025 may identify a first TTI duration for at least a first set of TTIs to be used for communications over at least a first component carrier and a second component carrier, and identify a second TTI duration for at least a second set of TTIs to be used for communications over one or more of the first component carrier or the second component carrier, the first TTI duration being shorter than the second TTI duration.

Resource identification component 1030 may receive, over the first component carrier, scheduling information for the second component carrier, the scheduling information indicating resources for transmissions over at least a subset of the first set of TTIs. In some cases, the receiving the scheduling information includes receiving, over the first component carrier, a first portion of the scheduling information during a first TTI of the second set of TTIs, where the first portion of the scheduling information is for two or more TTIs in the first set of TTIs, and receiving, over the second component carrier, a second portion of the scheduling information during a first TTI of the first set of TTIs, where the second portion of the scheduling information is for the first TTI of the first set of TTIs. In some cases, the first portion of the scheduling information includes common scheduling information for one or more UEs for use in receiving transmissions over two or more TTIs of the first set of TTIs, and where the second portion of the scheduling information includes UE-specific scheduling information for use in receiving transmissions over the first TTI of the first set of TTIs.

In some cases, the common scheduling information may be provided in a slow grant portion of a two-stage grant, and the UE-specific scheduling information may be provided in a fast grant portion of a two-stage grant. In some cases, the common scheduling information includes one or more of a frequency band of one or more TTIs of the first set of TTIs or a search space associated with the second portion of the scheduling information. In some cases, the receiving the scheduling information includes receiving, over the first component carrier, a first portion of the scheduling information during a first TTI of the second set of TTIs, where the first portion of the scheduling information is for two or more TTIs in the first set of TTIs, and receiving, over the first component carrier, a second portion of the scheduling information during a first TTI of the first set of TTIs, where the second portion of the scheduling information is for a second TTI of the first set of TTIs that is transmitted over the second component carrier. In some cases, the first portion of the scheduling information includes common scheduling information for two or more UEs for use in receiving transmissions over two or more TTIs of the first set of TTIs, and where the second portion of the scheduling information includes UE-specific scheduling information for use in receiving transmissions over the second TTI of the first set of TTIs. In some cases, the second portion of the scheduling information includes two or more grants for one or more UEs.

Scheduling component 1035 may receive a downlink transmission over the second component carrier based on the scheduling information or transmit an uplink transmission over the second component carrier based on the scheduling information. In some cases, the UE-specific scheduling information for the two or more UEs includes a first resource grant for a first UE that indicates first TTI resources on the second component carrier, and a second resource grant for a second UE that indicates first TTI resources on the first component carrier, and where the first TTI resources are rate-matched around the first resource grant and the second resource grant. In some cases, the first portion of the scheduling information includes first UE-specific scheduling information for use in receiving transmissions over two or more TTIs of the first set of TTIs, and where the second portion of the scheduling information includes second UE-specific scheduling information for use in receiving transmissions over the first TTI of the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a NDI, or a RV associated with the first TTI of the first set of TTIs.

In some cases, the scheduling information includes single-level or single-stage scheduling for two or more UEs that provides UE-specific resources on two or more component carriers for the first set of TTIs. In some cases, the common scheduling information includes one or more of a frequency band of one or more TTIs of the first set of TTIs or a search space associated with the second portion of the scheduling information, and the UE-specific scheduling information includes one or more of a resource assignment, a feedback process identification, a NDI, or a RV associated with the first TTI of the first set of TTIs. In some cases, the UE-specific scheduling information includes one or more of a resource assignment, a feedback process identification, a new data indicator (NDI), or a redundancy version (RV) associated with the first TTI of the first set of TTIs.

In some cases, two or more grants include a first resource grant for a first UE that indicates second TTI resources on the second component carrier, and a second resource grant for a second UE that indicates first TTI resources on the first component carrier, and where the first TTI resources are rate-matched around the first resource grant and the second resource grant. In some cases, the two or more grants are downlink grants and the first resource grant is located before the second resource grant in the first TTI of the first set of TTIs. In some cases, the two or more grants are downlink grants and the first resource grant is located after the second resource grant in the first TTI of the first set of TTIs. In some cases, the first resource grant and second resource grant indicate one or more of a resource assignment, a feedback process identification, a new data indicator (NDI), or a redundancy version (RV). In some cases, the scheduling information includes UE-specific scheduling information for two or more UEs and an indication of resources on two or more component carriers for the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a NDI, or a RV associated with the second TTI of the first set of TTIs.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may include a single antenna, or it may include a set of antennas.

Figure 11:
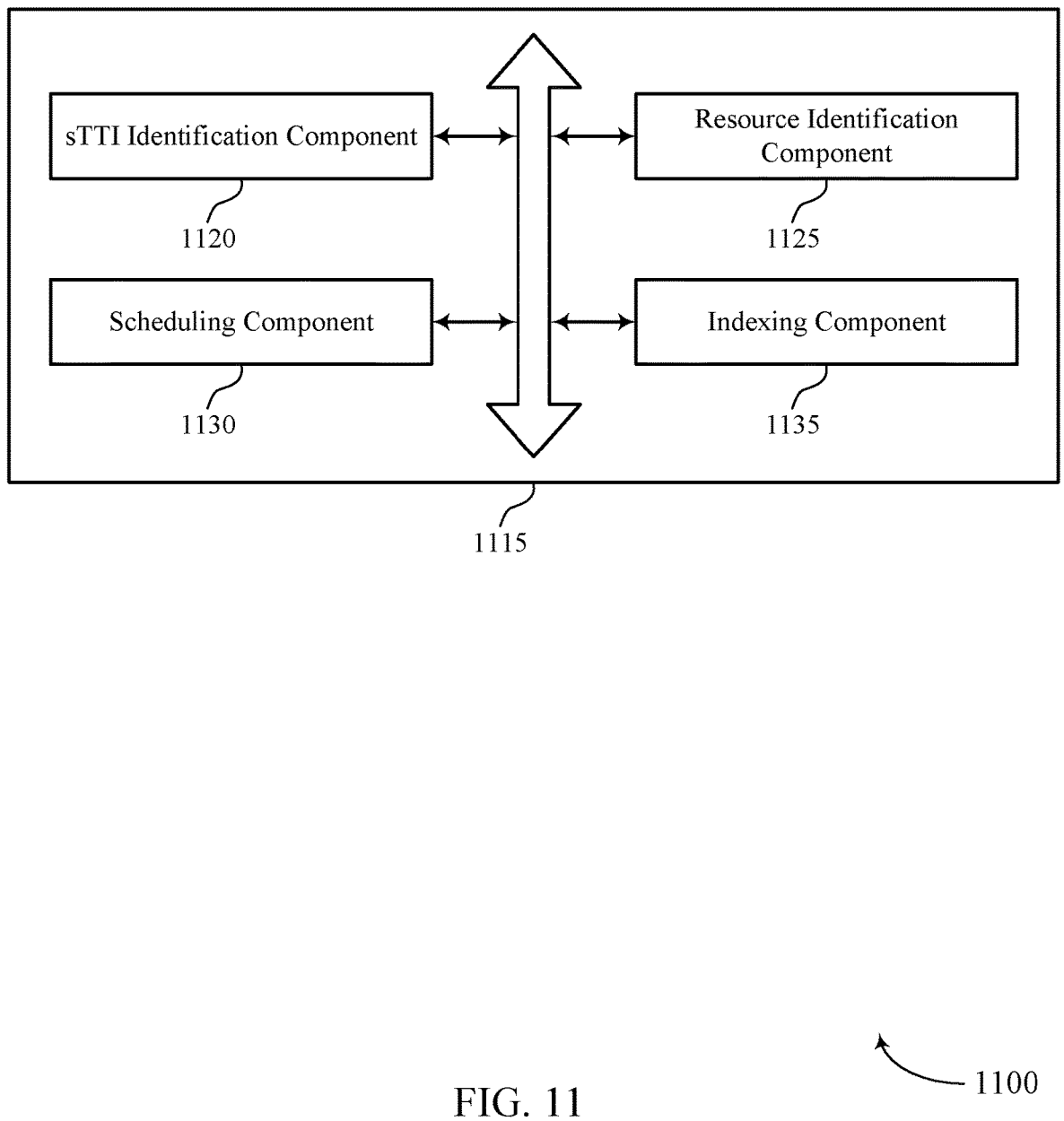

FIG. 11 shows a diagram 1100 of a UE resource manager 1115 that supports techniques for cross-carrier scheduling using multiple transmission time interval durations in accordance with various aspects of the present disclosure. The UE resource manager 1115 may be an example of aspects of a UE resource manager 915, a UE resource manager 1015, or a UE resource manager 1215 described with reference to FIGS. 9, 10, and 12. The UE resource manager 1115 may include sTTI identification component 1120, resource identification component 1125, scheduling component 1130, and indexing component 1135. Each of these modules may communicate, directly or indirectly, with one another (e.g., via one or more buses).

The sTTI identification component 1120 may identify a first TTI duration for at least a first set of TTIs to be used for communications over at least a first component carrier and a second component carrier, and identify a second TTI duration for at least a second set of TTIs to be used for communications over one or more of the first component carrier or the second component carrier, the first TTI duration being shorter than the second TTI duration.

Resource identification component 1125 may receive, over the first component carrier, scheduling information for the second component carrier, the scheduling information indicating resources for transmissions over at least a subset of the first set of TTIs. In some cases, the receiving the scheduling information includes receiving, over the first component carrier, a first portion of the scheduling information during a first TTI of the second set of TTIs, where the first portion of the scheduling information is for two or more TTIs in the first set of TTIs, and receiving, over the second component carrier, a second portion of the scheduling information during a first TTI of the first set of TTIs, where the second portion of the scheduling information is for the first TTI of the first set of TTIs. In some cases, the first portion of the scheduling information includes common scheduling information for one or more UEs for use in receiving transmissions over two or more TTIs of the first set of TTIs, and where the second portion of the scheduling information includes UE-specific scheduling information for use in receiving transmissions over the first TTI of the first set of TTIs.

In some cases, the common scheduling information may be provided in a slow grant portion of a two-stage grant, and the UE-specific scheduling information may be provided in a fast grant portion of a two-stage grant. In some cases, the common scheduling information includes one or more of a frequency band of one or more TTIs of the first set of TTIs or a search space associated with the second portion of the scheduling information. In some cases, the receiving the scheduling information includes receiving, over the first component carrier, a first portion of the scheduling information during a first TTI of the second set of TTIs, where the first portion of the scheduling information is for two or more TTIs in the first set of TTIs, and receiving, over the first component carrier, a second portion of the scheduling information during a first TTI of the first set of TTIs, where the second portion of the scheduling information is for a second TTI of the first set of TTIs that is transmitted over the second component carrier. In some cases, the first portion of the scheduling information includes common scheduling information for two or more UEs for use in receiving transmissions over two or more TTIs of the first set of TTIs, and where the second portion of the scheduling information includes UE-specific scheduling information for use in receiving transmissions over the second TTI of the first set of TTIs. In some cases, the second portion of the scheduling information includes two or more grants for one or more UEs.

Scheduling component 1130 may receive a downlink transmission over the second component carrier based on the scheduling information or transmit an uplink transmission over the second component carrier based on the scheduling information. In some cases, the UE-specific scheduling information for the two or more UEs includes a first resource grant for a first UE that indicates first TTI resources on the second component carrier, and a second resource grant for a second UE that indicates first TTI resources on the first component carrier, and where the first TTI resources are rate-matched around the first resource grant and the second resource grant. In some cases, the first portion of the scheduling information includes first UE-specific scheduling information for use in receiving transmissions over two or more TTIs of the first set of TTIs, and where the second portion of the scheduling information includes second UE-specific scheduling information for use in receiving transmissions over the first TTI of the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a NDI, or a RV associated with the first TTI of the first set of TTIs.

In some cases, the scheduling information includes single-level or single-stage scheduling for two or more UEs that provides UE-specific resources on two or more component carriers for the first set of TTIs. In some cases, the common scheduling information includes one or more of a frequency band of one or more TTIs of the first set of TTIs or a search space associated with the second portion of the scheduling information, and the UE-specific scheduling information includes one or more of a resource assignment, a feedback process identification, a NDI, or a RV associated with the first TTI of the first set of TTIs. In some cases, the UE-specific scheduling information includes one or more of a resource assignment, a feedback process identification, a new data indicator (NDI), or a redundancy version (RV) associated with the first TTI of the first set of TTIs.

In some cases, two or more grants include a first resource grant for a first UE that indicates second TTI resources on the second component carrier, and a second resource grant for a second UE that indicates first TTI resources on the first component carrier, and where the first TTI resources are rate-matched around the first resource grant and the second resource grant. In some cases, the two or more grants are downlink grants and the first resource grant is located before the second resource grant in the first TTI of the first set of TTIs. In some cases, the two or more grants are downlink grants and the first resource grant is located after the second resource grant in the first TTI of the first set of TTIs. In some cases, the first resource grant and second resource grant indicate one or more of a resource assignment, a feedback process identification, a new data indicator (NDI), or a redundancy version (RV). In some cases, the scheduling information includes UE-specific scheduling information for two or more UEs and an indication of resources on two or more component carriers for the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a NDI, or a RV associated with the second TTI of the first set of TTIs.

Indexing component 1135 may identify information in an indexing information field which, in some cases, may be included the second portion of the scheduling information and provides an indication of a starting location within the first TTI of the first set of TTIs of the second resource grant.

Figure 12:
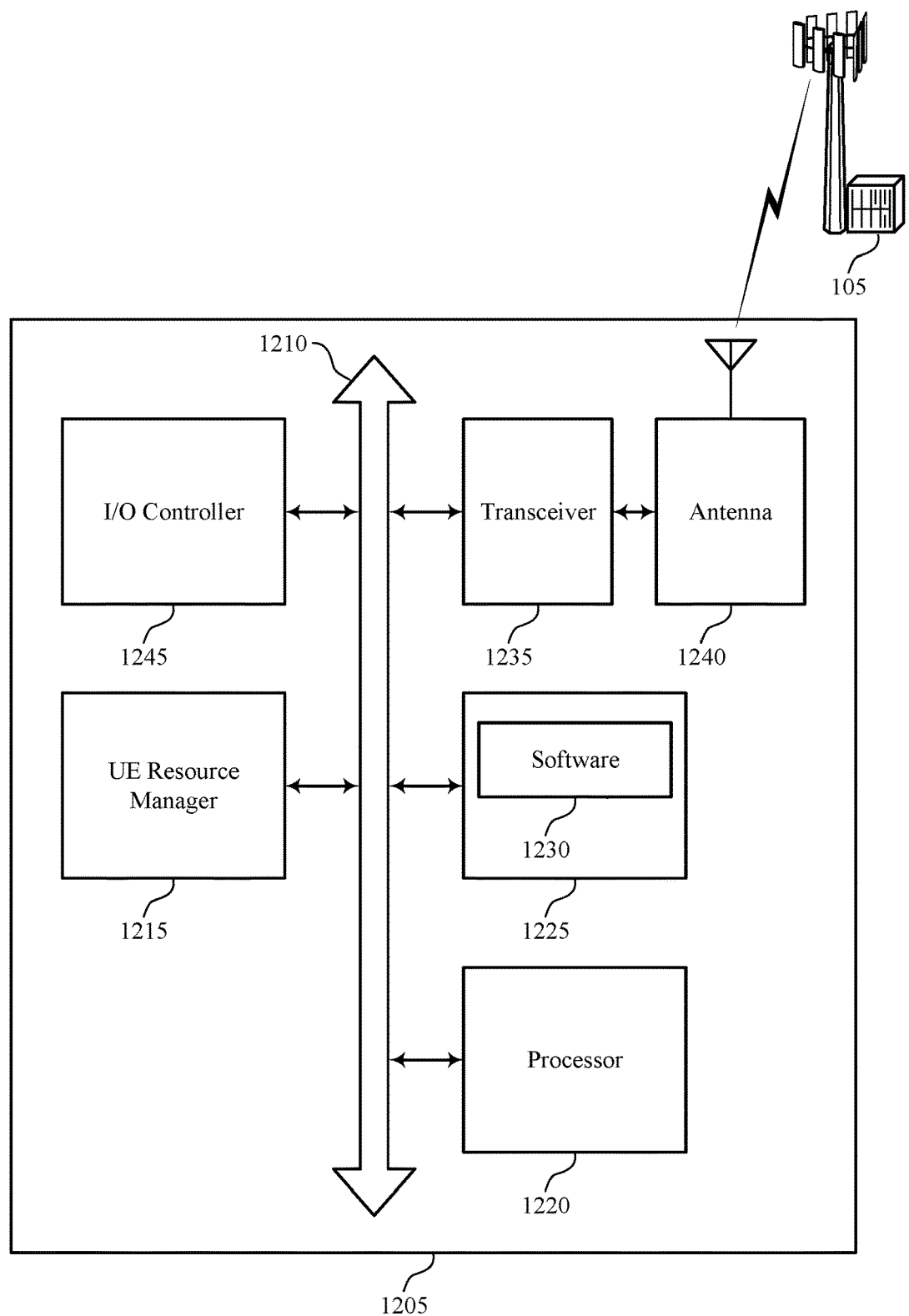
FIG. 12 illustrates a diagram of a system including a UE that supports techniques for cross-carrier scheduling using multiple transmission time interval durations in accordance with aspects of the present disclosure.

FIG. 12 shows a diagram of a system 1200 including a device 1205 that supports techniques for cross-carrier scheduling using multiple transmission time interval durations in accordance with various aspects of the present disclosure. Device 1205 may be an example of or include the components of wireless device 905, wireless device 1005, or a UE 115 as described above, e.g., with reference to FIGS. 1, 2, 8, 9 and 10. Device 1205 may include components for bi-directional voice and data communications including components for transmitting and receiving communications, including UE resource manager 1215, processor 1220, memory 1225, software 1230, transceiver 1235, antenna 1240, and I/O controller 1245. These components may be in electronic communication via one or more busses (e.g., bus 1210). Device 1205 may communicate wirelessly with one or more base stations 105.

Processor 1220 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting techniques for cross-carrier scheduling using multiple transmission time interval durations).

Memory 1225 may include random access memory (RAM) and read only memory (ROM). The memory 1225 may store computer-readable, computer-executable software 1230 including instructions that, when executed, cause the processor to perform various functions described herein. In some cases, the memory 1225 may contain, among other things, a basic input/output system (BIOS) which may control basic hardware and/or software operation such as the interaction with peripheral components or devices.

Software 1230 may include code to implement aspects of the present disclosure, including code to support techniques for cross-carrier scheduling using multiple transmission time interval durations. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
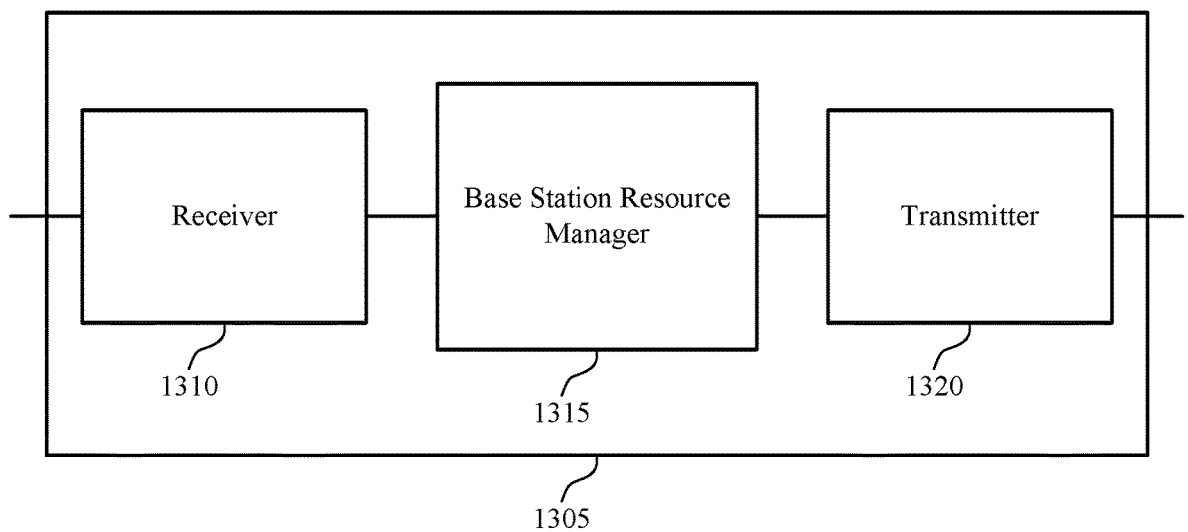
FIGS. 13 through 15 show diagrams of a device that supports techniques for cross-carrier scheduling using multiple transmission time interval durations in accordance with aspects of the present disclosure.

FIG. 13 shows a diagram 1300 of a wireless device 1305 that supports techniques for cross-carrier scheduling using multiple transmission time interval durations in accordance with various aspects of the present disclosure. Wireless device 1305 may be an example of aspects of a base station 105 as described with reference to FIGS. 1, 2, and 8. Wireless device 1305 may include receiver 1310, base station resource manager 1315, and transmitter 1320. Wireless device 1305 may also include a processor. Each of these components may be in communication with one another (e.g., via one or more buses).

Receiver 1310 may receive information such as packets, user data, or control information associated with various information channels (e.g., control channels, data channels, and information related to techniques for cross-carrier scheduling using multiple transmission time interval durations, etc.). Information may be passed on to other components of the device. The receiver 1310 may be an example of aspects of the transceiver 1635 described with reference to FIG. 16.

Base station resource manager 1315 may be an example of aspects of the base station resource manager 1615 described with reference to FIG. 16.

Base station resource manager 1315 and/or at least some of its various sub-components may be implemented in hardware, software executed by a processor, firmware, or any combination thereof. If implemented in software executed by a processor, the functions of the base station resource manager 1315 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station resource manager 1315 and/or at least some of its various sub-components may be physically located at various positions, including being distributed such that portions of functions are implemented at different physical locations by one or more physical devices. In some examples, base station resource manager 1315 and/or at least some of its various sub-components may be a separate and distinct component in accordance with various aspects of the present disclosure. In other examples, base station resource manager 1315 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station resource manager 1315 may identify a first TTI duration for at least a first set of TTIs to be used for communications over at least a first component carrier and a second component carrier, identify a second TTI duration for at least a second set of TTIs to be used for communications over one or more of the first component carrier or the second component carrier, the first TTI duration being shorter than the second TTI duration, transmit, over the first component carrier, scheduling information for the second component carrier, the scheduling information indicating resources for transmissions over at least a subset of the first set of TTIs, and transmit a downlink transmission over the second component carrier based on the scheduling information or receive an uplink transmission over the second component carrier based on the scheduling information.

Transmitter 1320 may transmit signals generated by other components of the device. In some examples, the transmitter 1320 may be collocated with a receiver 1310 in a transceiver module. For example, the transmitter 1320 may be an example of aspects of the transceiver 1635 described with reference to FIG. 16. The transmitter 1320 may include a single antenna, or it may include a set of antennas.

Figure 14:
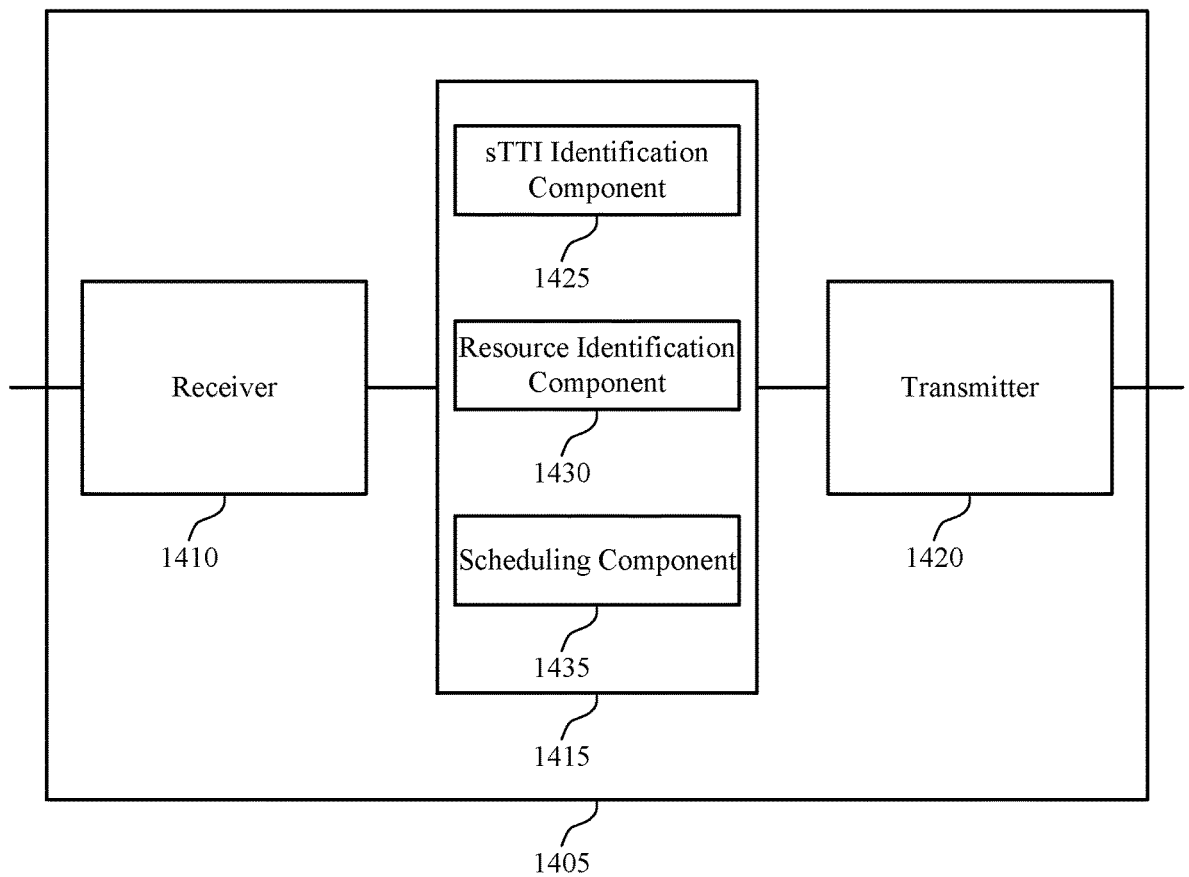

FIG. 14 shows a diagram 1400 of a wireless device 1405 that supports techniques for cross-carrier scheduling using multiple transmission time interval durations in accordance with various aspects of the present disclosure. Wireless device 1405 may be an example of aspects of a wireless device 1305 or a base station 105 as described with reference to FIGS. 1 and 13. Wireless device 1405 may include receiver 1410, base station resource manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to techniques for cross-carrier scheduling using multiple transmission time interval durations, etc.). Information may be passed on to other components of the device. The receiver 1410 may be an example of aspects of the transceiver 1635 described with reference to FIG. 16.

Base station resource manager 1415 may be an example of aspects of the base station resource manager 1615 described with reference to FIG. 16. Base station resource manager 1415 may also include sTTI identification component 1425, resource identification component 1430, and scheduling component 1435.

The sTTI identification component 1425 may identify a first TTI duration for at least a first set of TTIs to be used for communications over at least a first component carrier and a second component carrier, and identify a second TTI duration for at least a second set of TTIs to be used for communications over one or more of the first component carrier or the second component carrier, the first TTI duration being shorter than the second TTI duration.

Resource identification component 1430 may transmit, over the first component carrier, scheduling information for the second component carrier, the scheduling information indicating resources for transmissions over at least a subset of the first set of TTIs. In some cases, the transmitting the scheduling information includes transmitting, over the first component carrier, a first portion of the scheduling information during a first TTI of the second set of TTIs, where the first portion of the scheduling information is for two or more TTIs in the first set of TTIs, and transmitting, over the second component carrier, a second portion of the scheduling information during a first TTI of the first set of TTIs, where the second portion of the scheduling information is for the first TTI of the first set of TTIs.

In some cases, the first portion of the scheduling information includes common scheduling information for two or more TTIs of the first set of TTIs for two or more UEs, and where the second portion of the scheduling information includes UE-specific scheduling information for the first TTI of the first set of TTIs. In some cases, the first portion of the scheduling information includes first UE-specific scheduling information for two or more TTIs of the first set of TTIs, and where the second portion of the scheduling information includes second UE-specific scheduling information for the first TTI of the first set of TTIs.

In some cases, the scheduling information includes single-level scheduling for two or more UEs that provides UE-specific resources on two or more component carriers for the first set of TTIs.

In some cases, the transmitting the scheduling information includes transmitting, over the first component carrier, a first portion of the scheduling information during a first TTI of the second set of TTIs, where the first portion of the scheduling information is for two or more TTIs in the first set of TTIs, and transmitting, over the first component carrier, a second portion of the scheduling information during a first TTI of the first set of TTIs, where the second portion of the scheduling information is for a second TTI of the first set of TTIs that is transmitted over the second component carrier.

Scheduling component 1435 may transmit a downlink transmission over the second component carrier based on the scheduling information or receive an uplink transmission over the second component carrier based on the scheduling information. In some cases, the UE-specific scheduling information for the two or more UEs includes a first resource grant for a first UE that indicates first TTI resources on the second component carrier, and a second resource grant for a second UE that indicates first TTI resources on the first component carrier, and where the first TTI resources are rate-matched around the first resource grant and the second resource grant. In some cases, the UE-specific scheduling information includes one or more of a resource assignment, a feedback process identification, a NDI, or a RV associated with the first TTI of the first set of TTIs.

In some cases, the first UE-specific scheduling information includes one or more of a frequency band, a search space associated with the second portion of the scheduling information, a MCS, precoding information, antenna port information, or an aggregation level for one or more TTIs of the first set of TTIs, and the second UE-specific scheduling information includes one or more of a resource assignment, a feedback process identification, a NDI, or a RV associated with the first TTI of the first set of TTIs.

In some cases, the first portion of the scheduling information includes common scheduling information for two or more UEs for two or more TTIs of the first set of TTIs, and where the second portion of the scheduling information includes UE-specific scheduling information for the second TTI of the first set of TTIs. In some cases, the common scheduling information includes one or more of a frequency band of one or more TTIs of the first set of TTIs or a search space associated with the second portion of the scheduling information, and the UE-specific scheduling information includes one or more of a resource assignment, a feedback process identification, a NDI, or a RV associated with the first TTI of the first set of TTIs.

In some cases, the two or more grants include a first resource grant for a first UE that indicates second TTI resources on the second component carrier, and a second resource grant for a second UE that indicates first TTI resources on the first component carrier, and where the first TTI resources are rate-matched around the first resource grant and the second resource grant. In some cases, the two or more grants are downlink grants and the first resource grant is located before the second resource grant in the first TTI of the first set of TTIs. In some cases, the two or more grants are downlink grants and the first resource grant is located after the second resource grant in the first TTI of the first set of TTIs. In some cases, the first resource grant and second resource grant indicate one or more of a resource assignment, a feedback process identification, a NDI, or a RV.

In some cases, the scheduling information includes UE-specific scheduling information for two or more UEs and an indication of resources on two or more component carriers for the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a new data indicator (NDI), or a redundancy version (RV) associated with the second TTI of the first set of TTIs.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1635 described with reference to FIG. 16. The transmitter 1420 may include a single antenna, or it may include a set of antennas.

Figure 15:
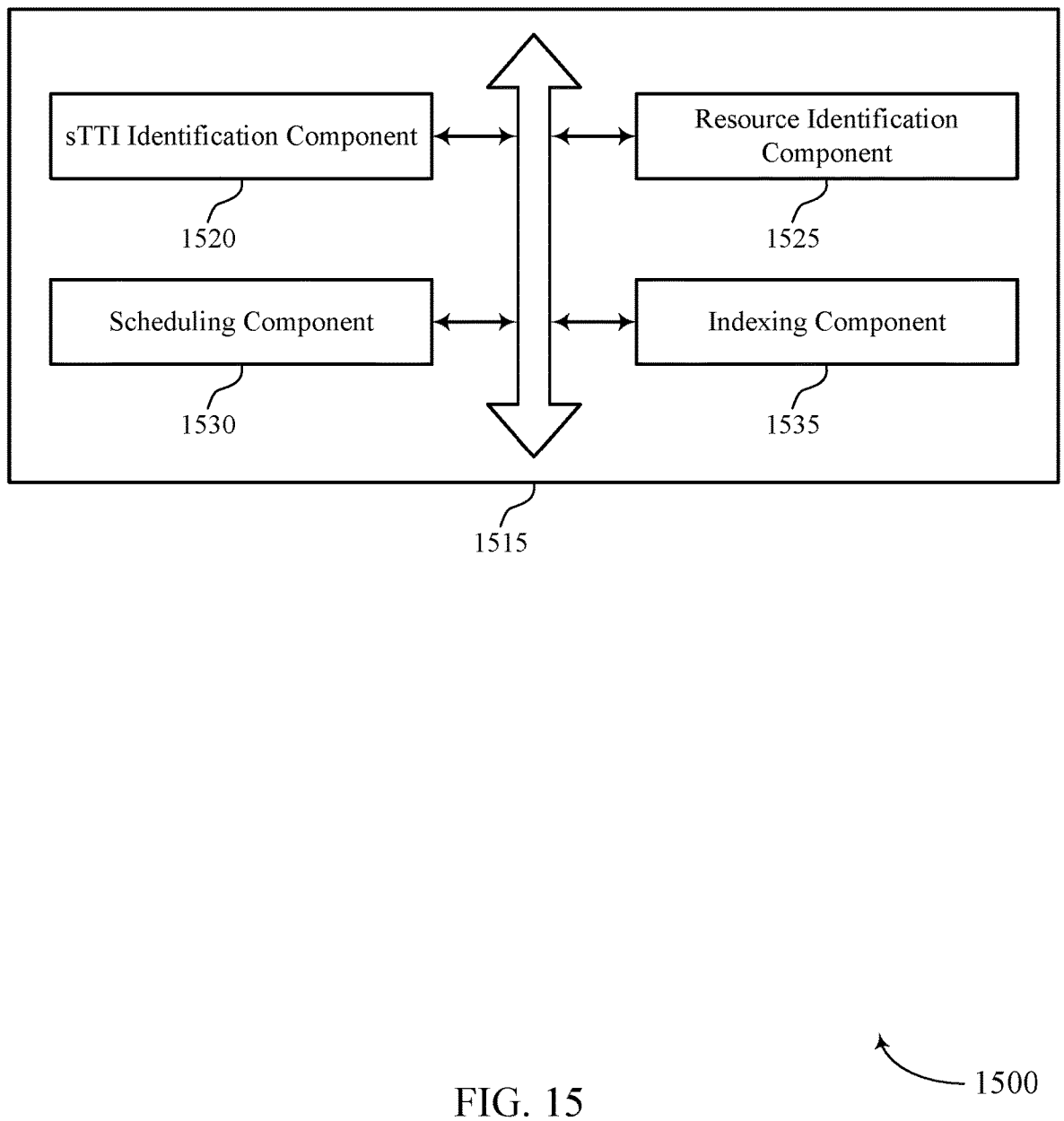

FIG. 15 shows a diagram 1500 of a base station resource manager 1515 that supports techniques for cross-carrier scheduling using multiple transmission time interval durations in accordance with various aspects of the present disclosure. The base station resource manager 1515 may be an example of aspects of a base station resource manager 1615 described with reference to FIGS. 13, 14, and 16. The base station resource manager 1515 may include sTTI identification component 1520, resource identification component 1525, scheduling component 1530, and indexing component 1535. Each of these modules may communicate, directly or indirectly, with one another (e.g., via one or more buses).

STTI identification component 1520 may identify a first TTI duration for at least a first set of TTIs to be used for communications over at least a first component carrier and a second component carrier, and identify a second TTI duration for at least a second set of TTIs to be used for communications over one or more of the first component carrier or the second component carrier, the first TTI duration being shorter than the second TTI duration.

Resource identification component 1525 may transmit, over the first component carrier, scheduling information for the second component carrier, the scheduling information indicating resources for transmissions over at least a subset of the first set of TTIs. In some cases, the transmitting the scheduling information includes transmitting, over the first component carrier, a first portion of the scheduling information during a first TTI of the second set of TTIs, where the first portion of the scheduling information is for two or more TTIs in the first set of TTIs, and transmitting, over the second component carrier, a second portion of the scheduling information during a first TTI of the first set of TTIs, where the second portion of the scheduling information is for the first TTI of the first set of TTIs.

In some cases, the first portion of the scheduling information includes common scheduling information for two or more TTIs of the first set of TTIs for two or more UEs, and where the second portion of the scheduling information includes UE-specific scheduling information for the first TTI of the first set of TTIs. In some cases, the first portion of the scheduling information includes first UE-specific scheduling information for two or more TTIs of the first set of TTIs, and where the second portion of the scheduling information includes second UE-specific scheduling information for the first TTI of the first set of TTIs.

In some cases, the scheduling information includes single-level scheduling for two or more UEs that provides UE-specific resources on two or more component carriers for the first set of TTIs.

In some cases, the transmitting the scheduling information includes transmitting, over the first component carrier, a first portion of the scheduling information during a first TTI of the second set of TTIs, where the first portion of the scheduling information is for two or more TTIs in the first set of TTIs, and transmitting, over the first component carrier, a second portion of the scheduling information during a first TTI of the first set of TTIs, where the second portion of the scheduling information is for a second TTI of the first set of TTIs that is transmitted over the second component carrier.

Scheduling component 1530 may transmit a downlink transmission over the second component carrier based on the scheduling information or receive an uplink transmission over the second component carrier based on the scheduling information. In some cases, the UE-specific scheduling information for the two or more UEs includes a first resource grant for a first UE that indicates first TTI resources on the second component carrier, and a second resource grant for a second UE that indicates first TTI resources on the first component carrier, and where the first TTI resources are rate-matched around the first resource grant and the second resource grant. In some cases, the UE-specific scheduling information includes one or more of a resource assignment, a feedback process identification, a NDI, or a RV associated with the first TTI of the first set of TTIs.

In some cases, the first UE-specific scheduling information includes one or more of a frequency band, a search space associated with the second portion of the scheduling information, a MCS, precoding information, antenna port information, or an aggregation level for one or more TTIs of the first set of TTIs, and the second UE-specific scheduling information includes one or more of a resource assignment, a feedback process identification, a NDI, or a RV associated with the first TTI of the first set of TTIs.

In some cases, the first portion of the scheduling information includes common scheduling information for two or more UEs for two or more TTIs of the first set of TTIs, and where the second portion of the scheduling information includes UE-specific scheduling information for the second TTI of the first set of TTIs. In some cases, the common scheduling information includes one or more of a frequency band of one or more TTIs of the first set of TTIs or a search space associated with the second portion of the scheduling information, and the UE-specific scheduling information includes one or more of a resource assignment, a feedback process identification, a NDI, or a RV associated with the first TTI of the first set of TTIs.

In some cases, the two or more grants include a first resource grant for a first UE that indicates second TTI resources on the second component carrier, and a second resource grant for a second UE that indicates first TTI resources on the first component carrier, and where the first TTI resources are rate-matched around the first resource grant and the second resource grant. In some cases, the two or more grants are downlink grants and the first resource grant is located before the second resource grant in the first TTI of the first set of TTIs. In some cases, the two or more grants are downlink grants and the first resource grant is located after the second resource grant in the first TTI of the first set of TTIs. In some cases, the first resource grant and second resource grant indicate one or more of a resource assignment, a feedback process identification, a NDI, or a RV.

In some cases, the scheduling information includes UE-specific scheduling information for two or more UEs and an indication of resources on two or more component carriers for the first set of TTIs. In some cases, the first UE-specific scheduling information includes one or more of a frequency band, a search space associated with the second portion of the scheduling information, a modulation and coding scheme (MCS), precoding information, antenna port information, or an aggregation level for one or more TTIs of the first set of TTIs, and the second UE-specific scheduling information includes one or more of a resource assignment, a feedback process identification, a new data indicator (NDI), or a redundancy version (RV) associated with the second TTI of the first set of TTIs.

Indexing component 1535 may, in some cases, provide as part of the second portion of the scheduling information an indication of a starting location within the first TTI of the first set of TTIs of the second resource grant.

Figure 16:
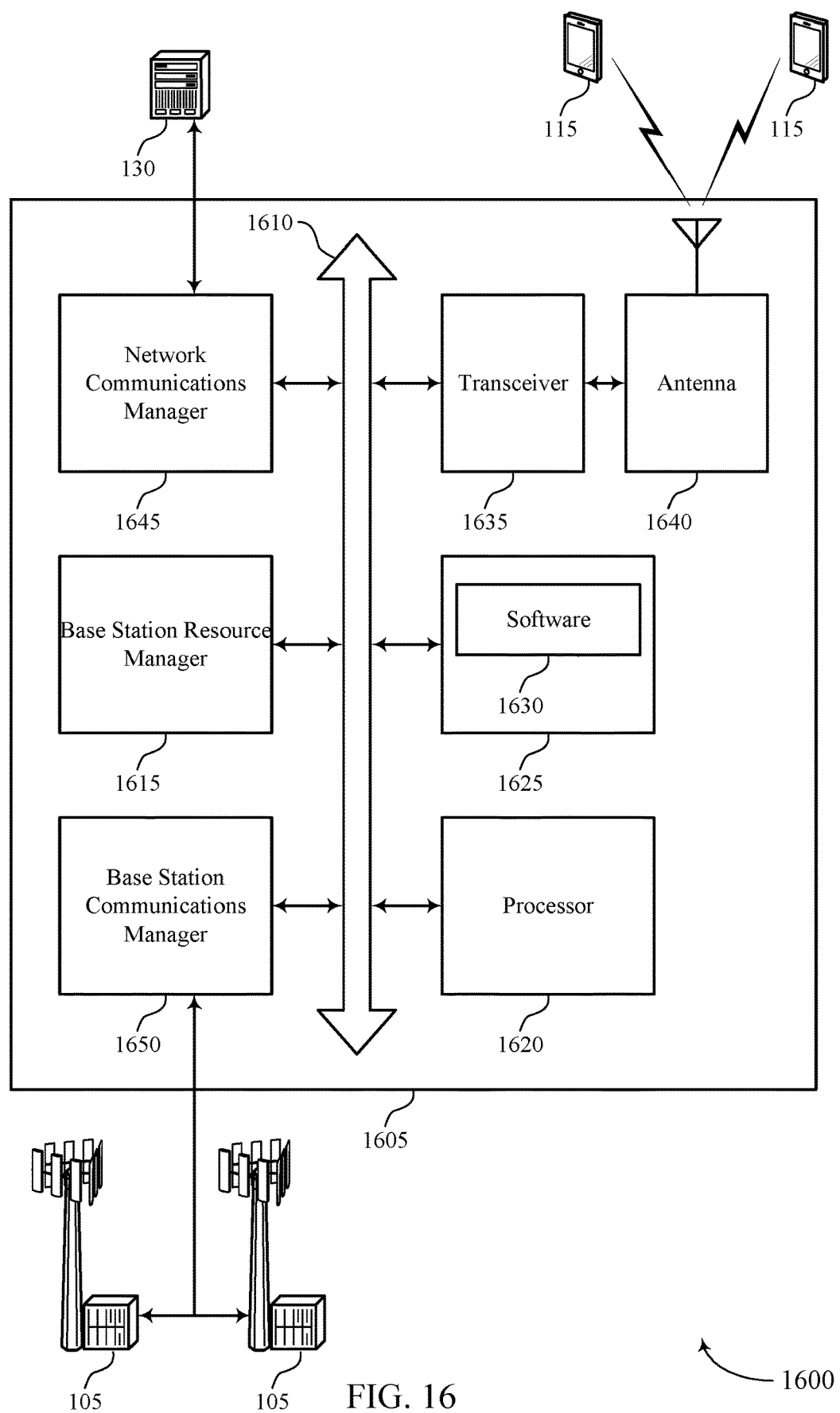
FIG. 16 illustrates a diagram of a system including a base station that supports techniques for cross-carrier scheduling using multiple transmission time interval durations in accordance with aspects of the present disclosure.

FIG. 16 shows a diagram of a system 1600 including a device 1605 that supports techniques for cross-carrier scheduling using multiple transmission time interval durations in accordance with various aspects of the present disclosure. Device 1605 may be an example of or include the components of base station 105 as described above, e.g., with reference to FIG. 1. Device 1605 may include components for bi-directional voice and data communications including components for transmitting and receiving communications, including base station resource manager 1615, processor 1620, memory 1625, software 1630, transceiver 1635, antenna 1640, network communications manager 1645, and base station communications manager 1650. These components may be in electronic communication via one or more busses (e.g., bus 1610). Device 1605 may communicate wirelessly with one or more UEs 115.

Processor 1620 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1620 may be configured to operate a memory array using a memory controller. In other cases, a memory controller may be integrated into processor 1620. Processor 1620 may be configured to execute computer-readable instructions stored in a memory to perform various functions (e.g., functions or tasks supporting techniques for cross-carrier scheduling using multiple transmission time interval durations).

Memory 1625 may include RAM and ROM. The memory 1625 may store computer-readable, computer-executable software 1630 including instructions that, when executed, cause the processor to perform various functions described herein. In some cases, the memory 1625 may contain, among other things, a BIOS which may control basic hardware and/or software operation such as the interaction with peripheral components or devices.

Software 1630 may include code to implement aspects of the present disclosure, including code to support techniques for cross-carrier scheduling using multiple transmission time interval durations. Software 1630 may be stored in a non-transitory computer-readable medium such as system memory or other memory. In some cases, the software 1630 may not be directly executable by the processor but may cause a computer (e.g., when compiled and executed) to perform functions described herein.

Transceiver 1635 may communicate bi-directionally, via one or more antennas, wired, or wireless links as described above. For example, the transceiver 1635 may represent a wireless transceiver and may communicate bi-directionally with another wireless transceiver. The transceiver 1635 may also include a modem to modulate the packets and provide the modulated packets to the antennas for transmission, and to demodulate packets received from the antennas.

In some cases, the wireless device may include a single antenna 1640. However, in some cases the device may have more than one antenna 1640, which may be capable of concurrently transmitting or receiving multiple wireless transmissions.

Network communications manager 1645 may manage communications with the core network (e.g., via one or more wired backhaul links). For example, the network communications manager 1645 may manage the transfer of data communications for client devices, such as one or more UEs 115.

Base station communications manager 1650 may manage communications with other base station 105, and may include a controller or scheduler for controlling communications with UEs 115 in cooperation with other base stations 105. For example, the base station communications manager 1650 may coordinate scheduling for transmissions to UEs 115 for various interference mitigation techniques such as beamforming or joint transmission. In some examples, base station communications manager 1650 may provide an X2 interface within an Long Term Evolution (LTE)/LTE-A wireless communication network technology to provide communication between base stations 105.

Figure 17:
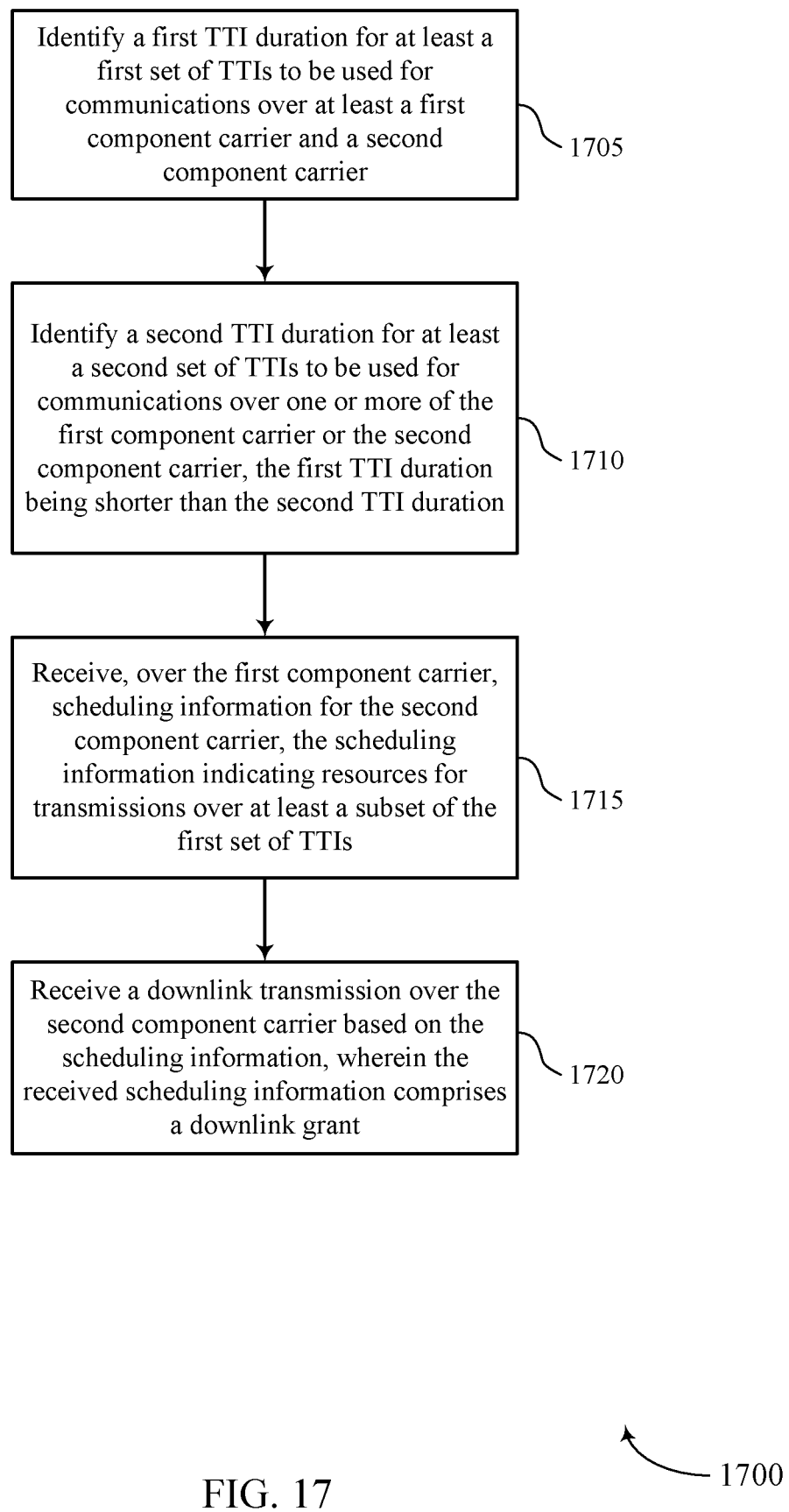
FIGS. 17 through 24 illustrate methods for techniques for cross-carrier scheduling using multiple transmission time interval durations in accordance with aspects of the present disclosure.

FIG. 17 shows a flowchart illustrating a method 1700 for techniques for cross-carrier scheduling using multiple transmission time interval durations in accordance with various aspects of the present disclosure. The operations of method 1700 may be implemented by a UE 115 or its components as described herein. For example, the operations of method 1700 may be performed by a UE resource manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1705 the UE 115 may identify a first TTI duration for at least a first set of TTIs to be used for communications over at least a first component carrier and a second component carrier. The operations of block 1705 may be performed according to the methods described with reference to FIGS. 1 through 8. In some examples, aspects of the operations of block 1705 may be performed by a sTTI identification component as described with reference to FIGS. 9 through 12.

At block 1710 the UE 115 may identify a second TTI duration for at least a second set of TTIs to be used for communications over one or more of the first component carrier or the second component carrier, the first TTI duration being shorter than the second TTI duration. The operations of block 1710 may be performed according to the methods described with reference to FIGS. 1 through 8. In some examples, aspects of the operations of block 1710 may be performed by a sTTI identification component as described with reference to FIGS. 9 through 12.

At block 1715 the UE 115 may receive, over the first component carrier, scheduling information for the second component carrier, the scheduling information indicating resources for transmissions over at least a subset of the first set of TTIs. The operations of block 1715 may be performed according to the methods described with reference to FIGS. 1 through 8. In some examples, aspects of the operations of block 1715 may be performed by a resource identification component as described with reference to FIGS. 9 through 12.

At block 1720 the UE 115 may receive a downlink transmission over the second component carrier based at least in part on the scheduling information. The operations of block 1720 may be performed according to the methods described with reference to FIGS. 1 through 8. In some examples, aspects of the operations of block 1720 may be performed by a scheduling component as described with reference to FIGS. 9 through 12.

Figure 18:
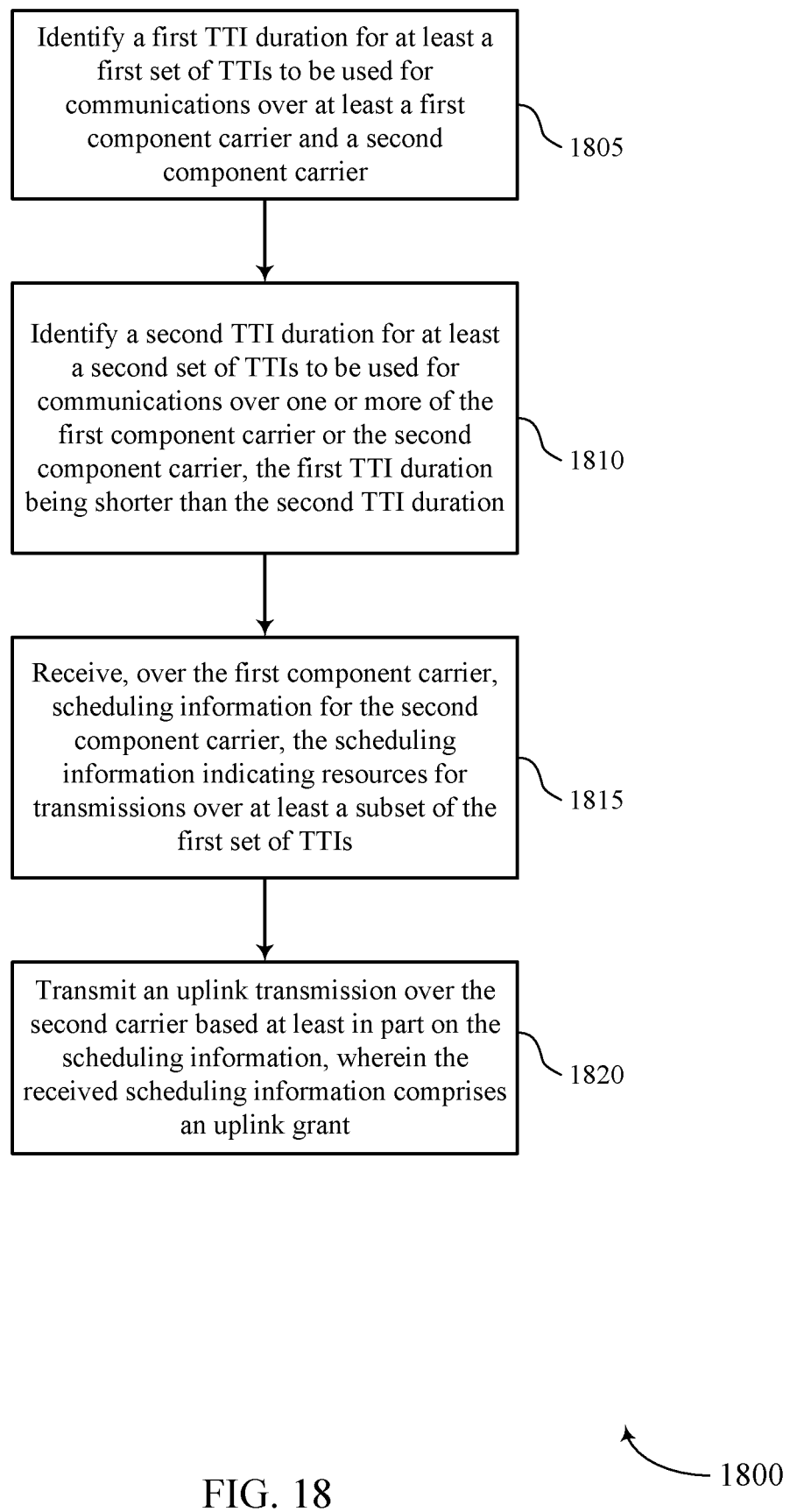

FIG. 18 shows a flowchart illustrating a method 1800 for techniques for cross-carrier scheduling using multiple transmission time interval durations in accordance with various aspects of the present disclosure. The operations of method 1800 may be implemented by a UE 115 or its components as described herein. For example, the operations of method 1800 may be performed by a UE resource manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1805 the UE 115 may identify a first TTI duration for at least a first set of TTIs to be used for communications over at least a first component carrier and a second component carrier. The operations of block 1805 may be performed according to the methods described with reference to FIGS. 1 through 8. In some examples, aspects of the operations of block 1805 may be performed by a sTTI identification component as described with reference to FIGS. 9 through 12.

At block 1810 the UE 115 may identify a second TTI duration for at least a second set of TTIs to be used for communications over one or more of the first component carrier or the second component carrier, the first TTI duration being shorter than the second TTI duration. The operations of block 1810 may be performed according to the methods described with reference to FIGS. 1 through 8. In some examples, aspects of the operations of block 1810 may be performed by a sTTI identification component as described with reference to FIGS. 9 through 12.

At block 1815 the UE 115 may receive, over the first component carrier, scheduling information for the second component carrier, the scheduling information indicating resources for transmissions over at least a subset of the first set of TTIs. The operations of block 1815 may be performed according to the methods described with reference to FIGS. 1 through 8. In some examples, aspects of the operations of block 1815 may be performed by a resource identification component as described with reference to FIGS. 9 through 12.

At block 1820 the UE 115 may transmit an uplink transmission over the second carrier based at least in part on the scheduling information, wherein the received scheduling information comprises an uplink grant. The operations of block 1820 may be performed according to the methods described with reference to FIGS. 1 through 8. In some examples, aspects of the operations of block 1820 may be performed by a scheduling component as described with reference to FIGS. 9 through 12.

Figure 19:
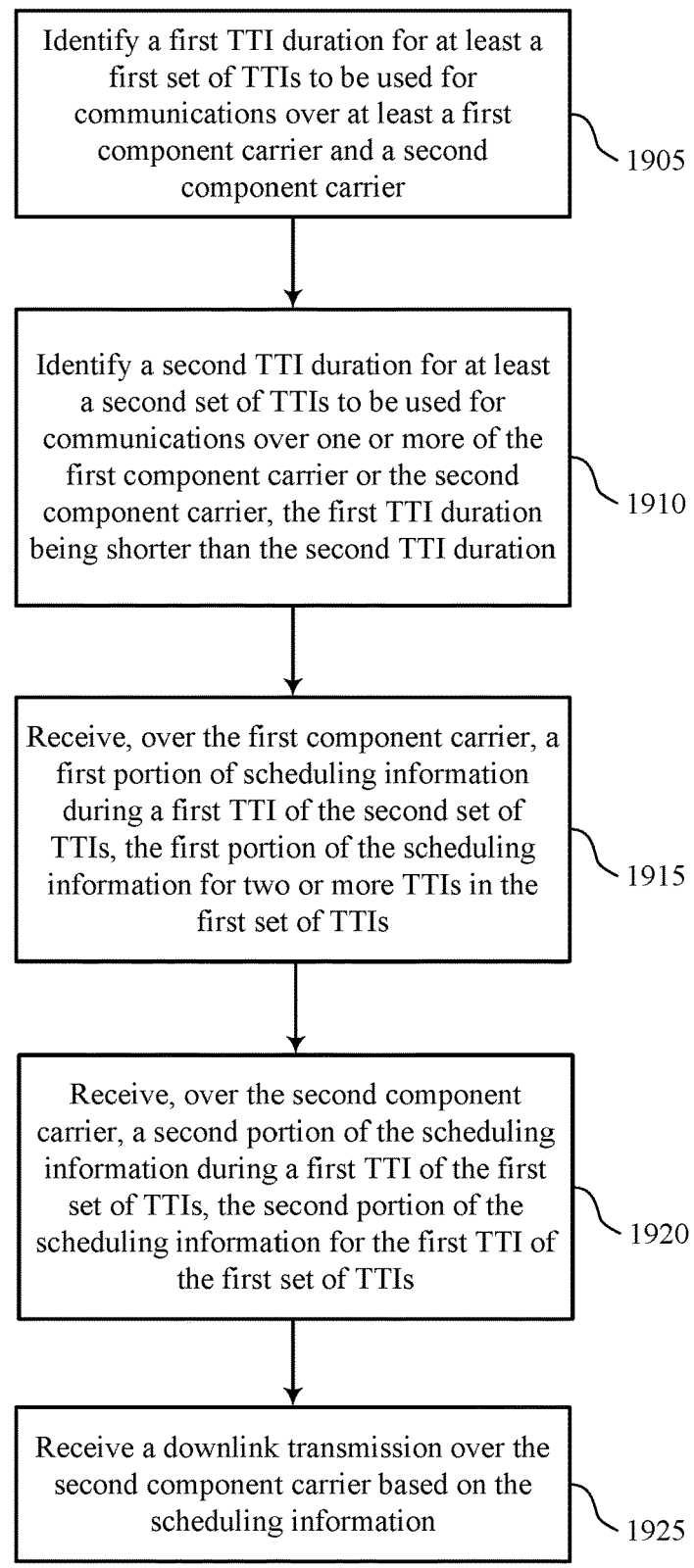

FIG. 19 shows a flowchart illustrating a method 1900 for techniques for cross-carrier scheduling using multiple transmission time interval durations in accordance with various aspects of the present disclosure. The operations of method 1900 may be implemented by a UE 115 or its components as described herein. For example, the operations of method 1900 may be performed by a UE resource manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 1905 the UE 115 may identify a first TTI duration for at least a first set of TTIs to be used for communications over at least a first component carrier and a second component carrier. The operations of block 1905 may be performed according to the methods described with reference to FIGS. 1 through 8. In some examples, aspects of the operations of block 1905 may be performed by a sTTI identification component as described with reference to FIGS. 9 through 12.

At block 1910 the UE 115 may identify a second TTI duration for at least a second set of TTIs to be used for communications over one or more of the first component carrier or the second component carrier, the first TTI duration being shorter than the second TTI duration. The operations of block 1910 may be performed according to the methods described with reference to FIGS. 1 through 8. In some examples, aspects of the operations of block 1910 may be performed by a sTTI identification component as described with reference to FIGS. 9 through 12.

At block 1915 the UE 115 may receive, over the first component carrier, a first portion of scheduling information during a first TTI of the second set of TTIs, the first portion of the scheduling information for two or more TTIs in the first set of TTIs. In some cases, the first portion of the scheduling information may include UE-specific information or may include common scheduling information for multiple UEs. The operations of block 1915 may be performed according to the methods described with reference to FIGS. 1 through 8. In some examples, aspects of the operations of block 1915 may be performed by a resource identification component as described with reference to FIGS. 9 through 12.

At block 1920 the UE 115 may receive, over the second component carrier, a second portion of the scheduling information during a first TTI of the first set of TTIs, the second portion of the scheduling information for the first TTI of the first set of TTIs. The operations of block 1920 may be performed according to the methods described with reference to FIGS. 1 through 8. In some examples, aspects of the operations of block 1920 may be performed by a resource identification component as described with reference to FIGS. 9 through 12.

At block 1925 the UE 115 may receive a downlink transmission over the second component carrier based at least in part on the scheduling information. The operations of block 1925 may be performed according to the methods described with reference to FIGS. 1 through 8. In some examples, aspects of the operations of block 1925 may be performed by a scheduling component as described with reference to FIGS. 9 through 12.

Figure 20:
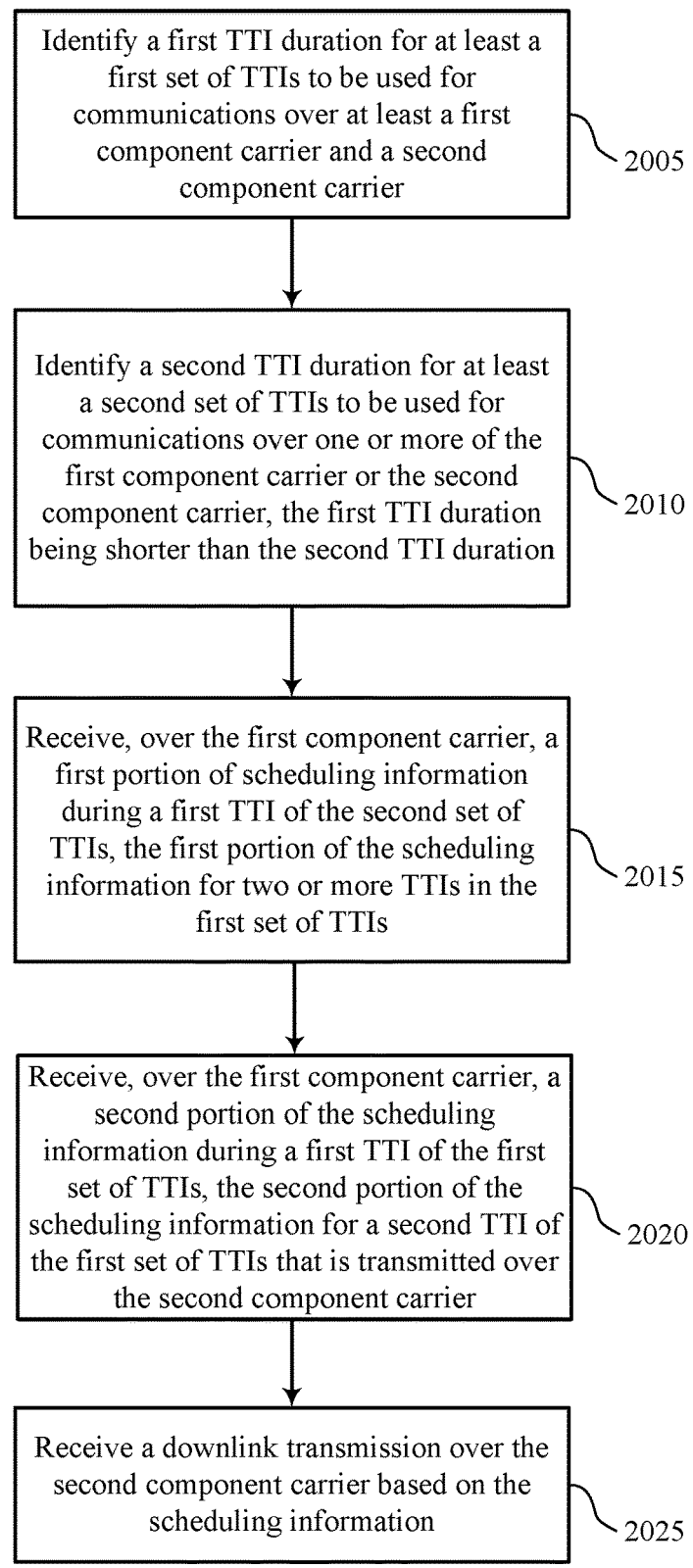

FIG. 20 shows a flowchart illustrating a method 2000 for techniques for cross-carrier scheduling using multiple transmission time interval durations in accordance with various aspects of the present disclosure. The operations of method 2000 may be implemented by a UE 115 or its components as described herein. For example, the operations of method 2000 may be performed by a UE resource manager as described with reference to FIGS. 9 through 12. In some examples, a UE 115 may execute a set of codes to control the functional elements of the device to perform the functions described below. Additionally or alternatively, the UE 115 may perform aspects of the functions described below using special-purpose hardware.

At block 2005 the UE 115 may identify a first TTI duration for at least a first set of TTIs to be used for communications over at least a first component carrier and a second component carrier. The operations of block 2005 may be performed according to the methods described with reference to FIGS. 1 through 8. In some examples, aspects of the operations of block 2005 may be performed by a sTTI identification component as described with reference to FIGS. 9 through 12.

At block 2010 the UE 115 may identify a second TTI duration for at least a second set of TTIs to be used for communications over one or more of the first component carrier or the second component carrier, the first TTI duration being shorter than the second TTI duration. The operations of block 2010 may be performed according to the methods described with reference to FIGS. 1 through 8. In some examples, aspects of the operations of block 2010 may be performed by a sTTI identification component as described with reference to FIGS. 9 through 12.

At block 2015 the UE 115 may receive, over the first component carrier, a first portion of scheduling information during a first TTI of the second set of TTIs, the first portion of the scheduling information for two or more TTIs in the first set of TTIs. In some cases, the first portion of the scheduling information may include UE-specific information or may include common scheduling information for multiple UEs. The operations of block 2015 may be performed according to the methods described with reference to FIGS. 1 through 8. In some examples, aspects of the operations of block 2015 may be performed by a resource identification component as described with reference to FIGS. 9 through 12.

At block 2020 the UE 115 may receive, over the first component carrier, a second portion of the scheduling information during a first TTI of the first set of TTIs, the second portion of the scheduling information for a second TTI of the first set of TTIs that is transmitted over the second component carrier. The operations of block 2020 may be performed according to the methods described with reference to FIGS. 1 through 8. In certain examples, aspects of the operations of block 2020 may be performed by a resource identification component as described with reference to FIGS. 9 through 12.

At block 2025 the UE 115 may receive a downlink transmission over the second component carrier based at least in part on the scheduling information. The operations of block 2025 may be performed according to the methods described with reference to FIGS. 1 through 8. In some examples, aspects of the operations of block 2025 may be performed by a scheduling component as described with reference to FIGS. 9 through 12.

Figure 21:
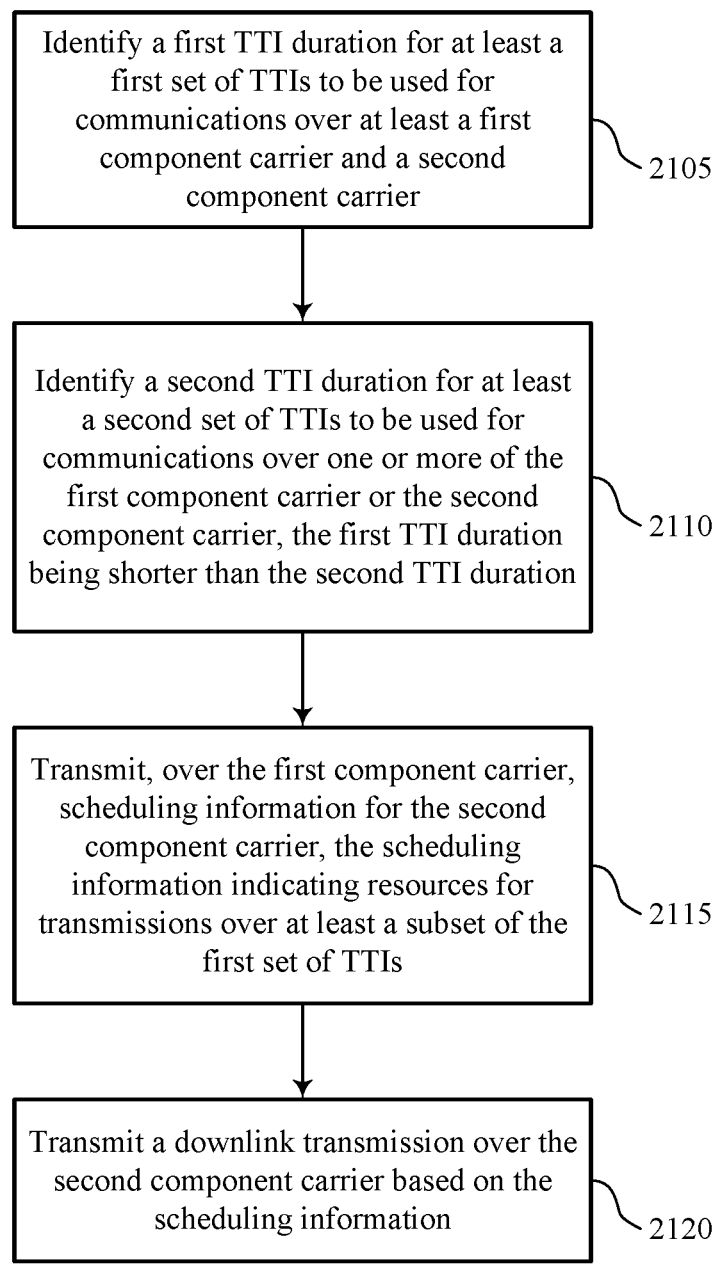

FIG. 21 shows a flowchart illustrating a method 2100 for techniques for cross-carrier scheduling using multiple transmission time interval durations in accordance with various aspects of the present disclosure. The operations of method 2100 may be implemented by a base station 105 or its components as described herein. For example, the operations of method 2100 may be performed by a base station resource manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2105 the base station 105 may identify a first TTI duration for at least a first set of TTIs to be used for communications over at least a first component carrier and a second component carrier. The operations of block 2105 may be performed according to the methods described with reference to FIGS. 1 through 8. In some examples, aspects of the operations of block 2105 may be performed by a sTTI identification component as described with reference to FIGS. 13 through 16.

At block 2110 the base station 105 may identify a second TTI duration for at least a second set of TTIs to be used for communications over one or more of the first component carrier or the second component carrier, the first TTI duration being shorter than the second TTI duration. The operations of block 2110 may be performed according to the methods described with reference to FIGS. 1 through 8. In some examples, aspects of the operations of block 2110 may be performed by a sTTI identification component as described with reference to FIGS. 13 through 16.

At block 2115 the base station 105 may transmit, over the first component carrier, scheduling information for the second component carrier, the scheduling information indicating resources for transmissions over at least a subset of the first set of TTIs. The operations of block 2115 may be performed according to the methods described with reference to FIGS. 1 through 8. In certain examples, aspects of the operations of block 2115 may be performed by a resource identification component as described with reference to FIGS. 13 through 16.

At block 2120 the base station 105 may transmit a downlink transmission over the second component carrier based at least in part on the scheduling information. The operations of block 2120 may be performed according to the methods described with reference to FIGS. 1 through 8. In some examples, aspects of the operations of block 2120 may be performed by a scheduling component as described with reference to FIGS. 13 through 16.

Figure 22:
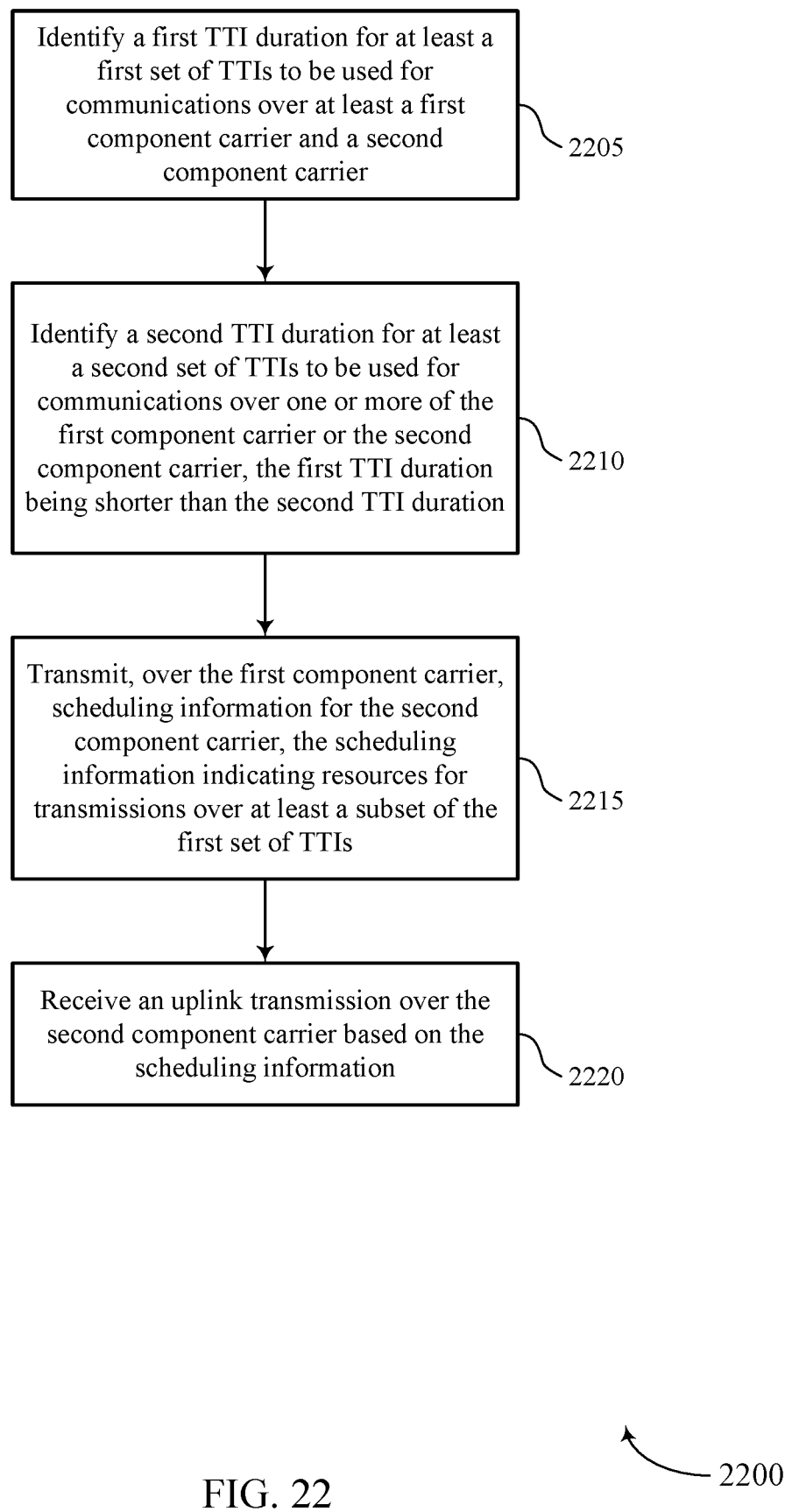

FIG. 22 shows a flowchart illustrating a method 2200 for techniques for cross-carrier scheduling using multiple transmission time interval durations in accordance with various aspects of the present disclosure. The operations of method 2200 may be implemented by a base station 105 or its components as described herein. For example, the operations of method 2200 may be performed by a base station resource manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2205 the base station 105 may identify a first TTI duration for at least a first set of TTIs to be used for communications over at least a first component carrier and a second component carrier. The operations of block 2205 may be performed according to the methods described with reference to FIGS. 1 through 8. In some examples, aspects of the operations of block 2205 may be performed by a sTTI identification component as described with reference to FIGS. 13 through 16.

At block 2210 the base station 105 may identify a second TTI duration for at least a second set of TTIs to be used for communications over one or more of the first component carrier or the second component carrier, the first TTI duration being shorter than the second TTI duration. The operations of block 2210 may be performed according to the methods described with reference to FIGS. 1 through 8. In some examples, aspects of the operations of block 2210 may be performed by a sTTI identification component as described with reference to FIGS. 13 through 16.

At block 2215 the base station 105 may transmit, over the first component carrier, scheduling information for the second component carrier, the scheduling information indicating resources for transmissions over at least a subset of the first set of TTIs. The operations of block 2215 may be performed according to the methods described with reference to FIGS. 1 through 8. In certain examples, aspects of the operations of block 2215 may be performed by a resource identification component as described with reference to FIGS. 13 through 16.

At block 2220 the base station 105 may receive an uplink transmission over the second component carrier based on the scheduling information. The operations of block 2220 may be performed according to the methods described with reference to FIGS. 1 through 8. In some examples, aspects of the operations of block 2220 may be performed by a scheduling component as described with reference to FIGS. 13 through 16.

Figure 23:
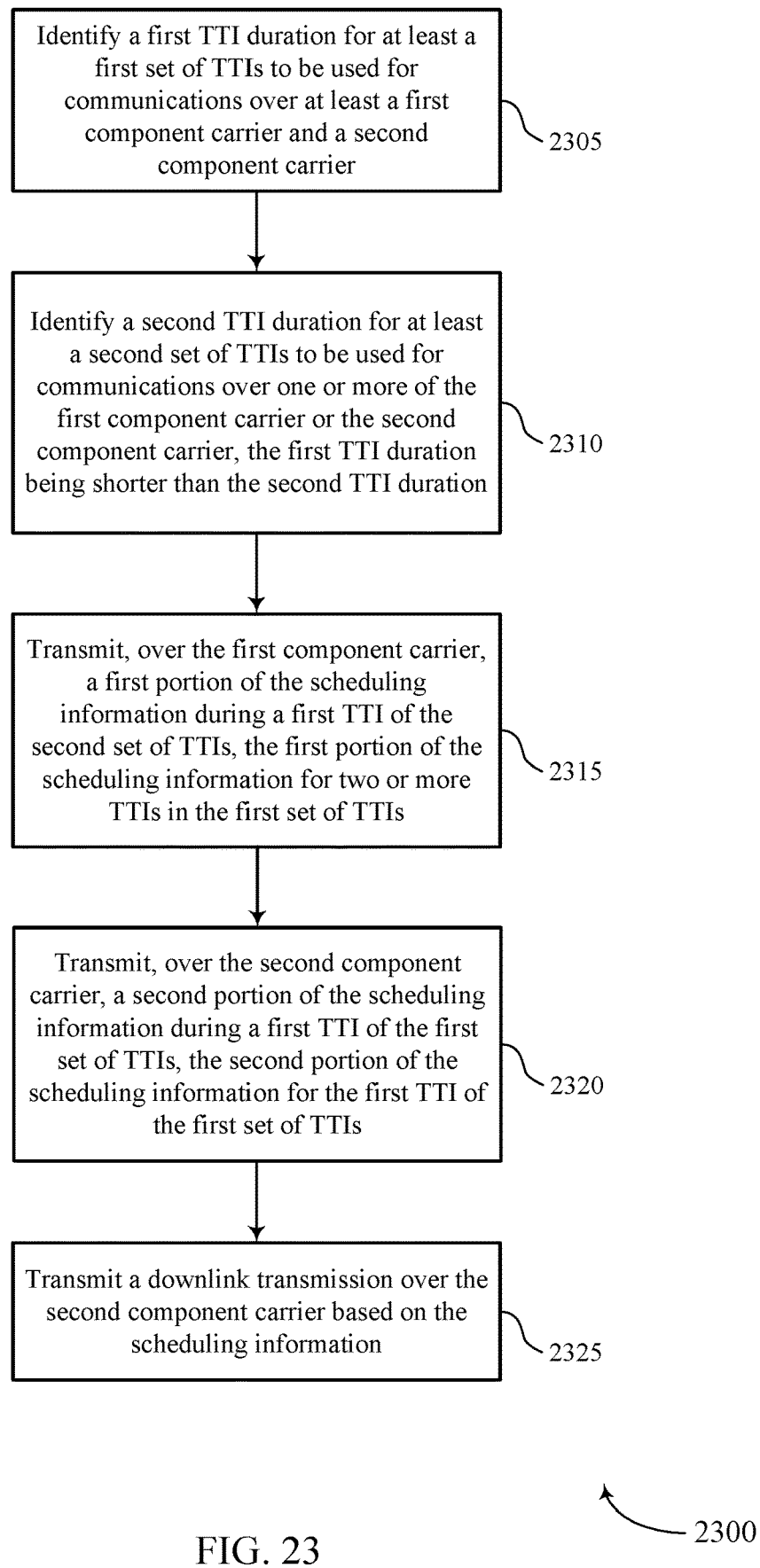

FIG. 23 shows a flowchart illustrating a method 2300 for techniques for cross-carrier scheduling using multiple transmission time interval durations in accordance with various aspects of the present disclosure. The operations of method 2300 may be implemented by a base station 105 or its components as described herein. For example, the operations of method 2300 may be performed by a base station resource manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2305 the base station 105 may identify a first TTI duration for at least a first set of TTIs to be used for communications over at least a first component carrier and a second component carrier. The operations of block 2305 may be performed according to the methods described with reference to FIGS. 1 through 8. In some examples, aspects of the operations of block 2305 may be performed by a sTTI identification component as described with reference to FIGS. 13 through 16.

At block 2310 the base station 105 may identify a second TTI duration for at least a second set of TTIs to be used for communications over one or more of the first component carrier or the second component carrier, the first TTI duration being shorter than the second TTI duration. The operations of block 2310 may be performed according to the methods described with reference to FIGS. 1 through 8. In some examples, aspects of the operations of block 2310 may be performed by a sTTI identification component as described with reference to FIGS. 13 through 16.

At block 2315 the base station 105 may transmit, over the first component carrier, a first portion of the scheduling information during a first TTI of the second set of TTIs, the first portion of the scheduling information for two or more TTIs in the first set of TTIs. In some cases, the first portion of the scheduling information may include UE-specific information or may include common scheduling information for multiple UEs. The operations of block 2315 may be performed according to the methods described with reference to FIGS. 1 through 8. In some examples, aspects of the operations of block 2315 may be performed by a resource identification component as described with reference to FIGS. 13 through 16.

At block 2320 the base station 105 may transmit, over the second component carrier, a second portion of the scheduling information during a first TTI of the first set of TTIs, the second portion of the scheduling information for the first TTI of the first set of TTIs. The operations of block 2320 may be performed according to the methods described with reference to FIGS. 1 through 8. In some examples, aspects of the operations of block 2320 may be performed by a resource identification component as described with reference to FIGS. 13 through 16.

At block 2325 the base station 105 may transmit a downlink transmission over the second component carrier based at least in part on the scheduling information. The operations of block 2325 may be performed according to the methods described with reference to FIGS. 1 through 8. In some examples, aspects of the operations of block 2325 may be performed by a scheduling component as described with reference to FIGS. 13 through 16.

Figure 24:
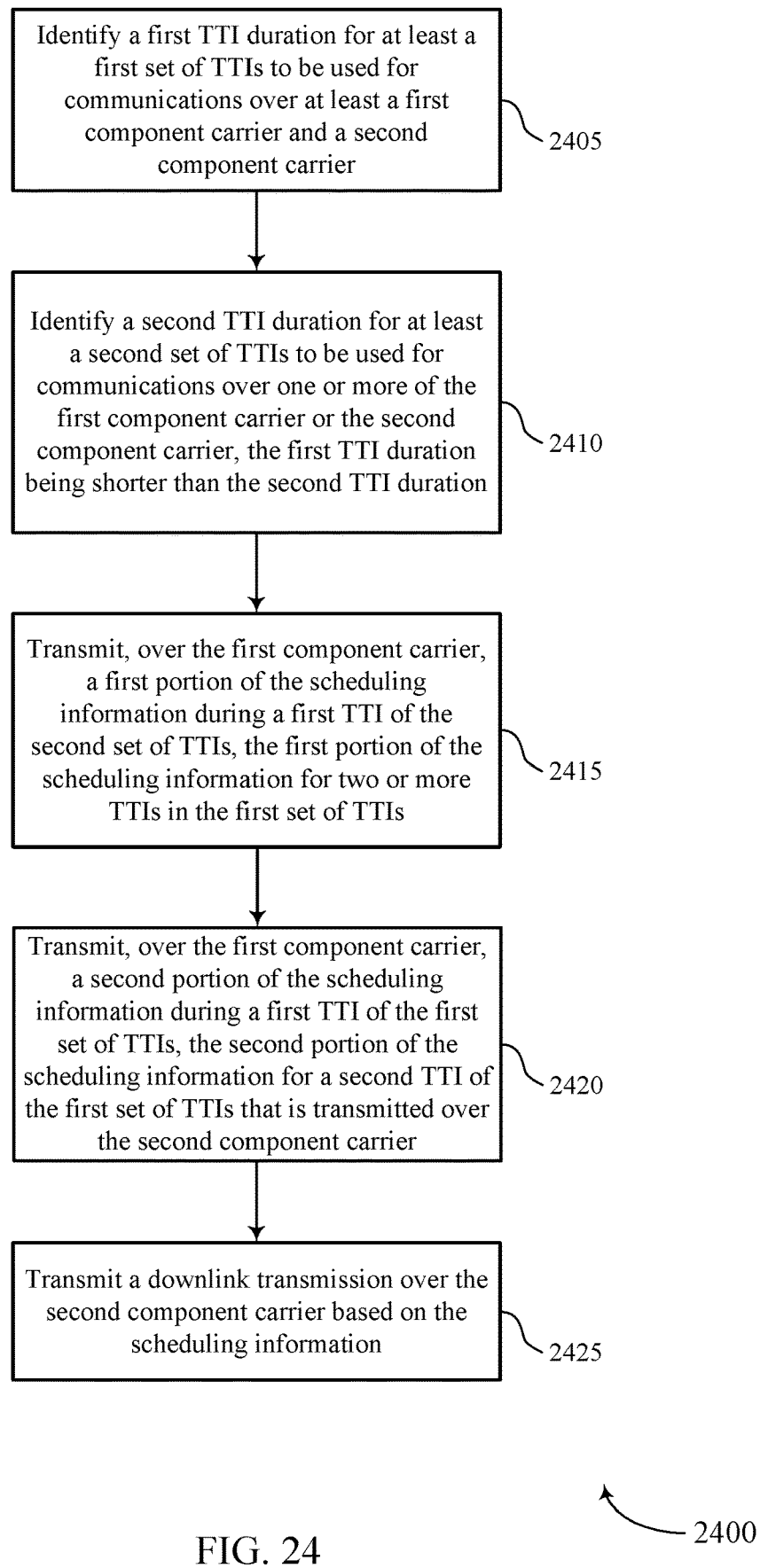

FIG. 24 shows a flowchart illustrating a method 2400 for techniques for cross-carrier scheduling using multiple transmission time interval durations in accordance with various aspects of the present disclosure. The operations of method 2400 may be implemented by a base station 105 or its components as described herein. For example, the operations of method 2400 may be performed by a base station resource manager as described with reference to FIGS. 13 through 16. In some examples, a base station 105 may execute a set of codes to control the functional elements of the device to perform the functions described below. Additionally or alternatively, the base station 105 may perform aspects of the functions described below using special-purpose hardware.

At block 2405 the base station 105 may identify a first TTI duration for at least a first set of TTIs to be used for communications over at least a first component carrier and a second component carrier. The operations of block 2405 may be performed according to the methods described with reference to FIGS. 1 through 8. In some examples, aspects of the operations of block 2405 may be performed by a sTTI identification component as described with reference to FIGS. 13 through 16.

At block 2410 the base station 105 may identify a second TTI duration for at least a second set of TTIs to be used for communications over one or more of the first component carrier or the second component carrier, the first TTI duration being shorter than the second TTI duration. The operations of block 2410 may be performed according to the methods described with reference to FIGS. 1 through 8. In some examples, aspects of the operations of block 2410 may be performed by a sTTI identification component as described with reference to FIGS. 13 through 16.

At block 2415 the base station 105 may transmit, over the first component carrier, a first portion of the scheduling information during a first TTI of the second set of TTIs, the first portion of the scheduling information for two or more TTIs in the first set of TTIs. In some cases, the first portion of the scheduling information may include UE-specific information or may include common scheduling information for multiple UEs. The operations of block 2415 may be performed according to the methods described with reference to FIGS. 1 through 8. In some examples, aspects of the operations of block 2415 may be performed by a resource identification component as described with reference to FIGS. 13 through 16.

At block 2420 the base station 105 may transmit, over the first component carrier, a second portion of the scheduling information during a first TTI of the first set of TTIs, the second portion of the scheduling information for a second TTI of the first set of TTIs that is transmitted over the second component carrier. The operations of block 2420 may be performed according to the methods described with reference to FIGS. 1 through 8. In certain examples, aspects of the operations of block 2420 may be performed by a resource identification component as described with reference to FIGS. 13 through 16.

At block 2425 the base station 105 may transmit a downlink transmission over the second component carrier based at least in part on the scheduling information. The operations of block 2425 may be performed according to the methods described with reference to FIGS. 1 through 8. In some examples, aspects of the operations of block 2425 may be performed by a scheduling component as described with reference to FIGS. 13 through 16.

In some cases, the transmitting the scheduling information comprises transmitting, over the first component carrier, a first portion of the scheduling information during a first TTI of the second set of TTIs, wherein the first portion of the scheduling information is for two or more TTIs in the first set of TTIs, and transmitting, over the first component carrier, a second portion of the scheduling information during a first TTI of the first set of TTIs, wherein the second portion of the scheduling information is for a second TTI of the first set of TTIs that is transmitted over the second component carrier.

In some examples, aspects from two or more of the methods 1700, 1800, 1900, 2000, 2100, or 2200 described with reference to FIGS. 17-22 may be combined. It should be noted that the methods 1700-2200 are just example implementations, and that the operations of the methods 1700-2200 may be rearranged or otherwise modified such that other implementations are possible.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, NR, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of evolved node B (eNBs) provide coverage for various geographical regions. For example, each eNB, gNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), next generation NodeB (gNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in diagram form in order to avoid obscuring the concepts of the described examples.

In the appended figures, similar components or features may have the same reference label. Additionally, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   establishing, by a user equipment (UE), a connection with a base station;
   identifying, by the UE and based at least in part on the established connection, a first transmission time interval (TTI) duration for at least a first set of TTIs available for communications over at least a first component carrier and a second component carrier;
   identifying, by the UE, a second TTI duration for at least a second set of TTIs available for communications over one or more of the first component carrier or the second component carrier, the first TTI duration being shorter than the second TTI duration;
   receiving, by the UE over the first component carrier, a first portion of scheduling information during a first TTI of the second set of TTIs, wherein the first portion of the scheduling information indicates resources for transmissions over at least a first subset of the first set of TTIs having the first TTI duration that is shorter than the second TTI duration; and
   receiving, by the UE over the first component carrier or the second component carrier during a first TTI of the first set of TTIs, a second portion of the scheduling information, wherein the second portion of the scheduling information indicates resources for transmissions over at least a second subset of the first set of TTIs.

2. The method of claim 1, further comprising:
   receiving a downlink transmission over the second component carrier based at least in part on the scheduling information, wherein the received scheduling information comprises a downlink grant.

3. The method of claim 1, further comprising:
   transmitting an uplink transmission over the second component carrier based at least in part on the scheduling information, wherein the received scheduling information comprises an uplink grant.

4. The method of claim 1, wherein the receiving the first portion of the scheduling information and the second portion of the scheduling information comprises:
   receiving the second portion of the scheduling information over the second component carrier, wherein the second portion of the scheduling information is for the first TTI of the first set of TTIs, and wherein the first portion of the scheduling information is for two or more TTIs in the first set of TTIs.

5. The method of claim 4, wherein the first portion of the scheduling information comprises common scheduling information for two or more UEs for use in receiving transmissions over two or more TTIs of the first set of TTIs, and wherein the second portion of the scheduling information comprises UE-specific scheduling information for use in receiving transmissions over the first TTI of the first set of TTIs.

6. The method of claim 5, wherein the common scheduling information comprises one or more of a frequency band of one or more TTIs of the first set of TTIs or a search space associated with the second portion of the scheduling information.

7. The method of claim 5, wherein the UE-specific scheduling information comprises one or more of a resource assignment, a feedback process identification, a new data indicator (NDI), or a redundancy version (RV) associated with the first TTI of the first set of TTIs.

8. The method of claim 4, wherein:
   the first portion of the scheduling information comprises first UE-specific scheduling information for use in receiving transmissions over two or more TTIs of the first set of TTIs; and
   the second portion of the scheduling information comprises second UE-specific scheduling information for use in receiving transmissions over the first TTI of the first set of TTIs.

9. The method of claim 8, wherein:
   the first UE-specific scheduling information comprises one or more of a frequency band, a search space associated with the second portion of the scheduling information, a modulation and coding scheme (MCS), precoding information, antenna port information, or an aggregation level for one or more TTIs of the first set of TTIs; and
   the second UE-specific scheduling information comprises one or more of a resource assignment, a feedback process identification, a new data indicator (NDI), or a redundancy version (RV) associated with the first TTI of the first set of TTIs.

10. The method of claim 1, wherein the scheduling information comprises single-level scheduling for two or more UEs that provides UE-specific resources on two or more component carriers for the first set of TTIs.

11. The method of claim 1, wherein the receiving the first portion of the scheduling information and the second portion of the scheduling information comprises:
    receiving the second portion of the scheduling information over the first component carrier, wherein the second portion of the scheduling information is for a second TTI of the first set of TTIs that is transmitted over the second component carrier, and wherein the first portion of the scheduling information is for two or more TTIs in the first set of TTIs.

12. The method of claim 11, wherein:
the first portion of the scheduling information comprises common scheduling information for two or more UEs for use in receiving transmissions over two or more TTIs of the first set of TTIs; and
the second portion of the scheduling information comprises UE-specific scheduling information for use in receiving transmissions over the second TTI of the first set of TTIs.

13. The method of claim 12, wherein:
the common scheduling information comprises one or more of a frequency band of one or more TTIs of the first set of TTIs or a search space associated with the second portion of the scheduling information; and
the UE-specific scheduling information comprises one or more of a resource assignment, a feedback process identification, a new data indicator (NDI), or a redundancy version (RV) associated with the first TTI of the first set of TTIs.

14. The method of claim 11, wherein:
the first portion of the scheduling information comprises first UE-specific scheduling information for use in receiving transmissions over two or more TTIs of the first set of TTIs; and
the second portion of the scheduling information comprises second UE-specific scheduling information for use in receiving transmissions over the first TTI of the first set of TTIs.

15. The method of claim 14, wherein:
the first UE-specific scheduling information comprises one or more of a frequency band, a search space associated with the second portion of the scheduling information, a modulation and coding scheme (MCS), precoding information, antenna port information, or an aggregation level for one or more TTIs of the first set of TTIs; and
the second UE-specific scheduling information comprises one or more of a resource assignment, a feedback process identification, a new data indicator (NDI), or a redundancy version (RV) associated with the second TTI of the first set of TTIs.

16. The method of claim 11, wherein the second portion of the scheduling information includes two or more grants for one or more UEs.

17. The method of claim 16, wherein:
the two or more grants include a first resource grant for a first UE that indicates second TTI resources on the second component carrier, and a second resource grant for a second UE that indicates first TTI resources on the first component carrier; and
the first TTI resources are rate-matched around the first resource grant and the second resource grant.

18. The method of claim 17, wherein the two or more grants are downlink grants and the first resource grant is located before the second resource grant in the first TTI of the first set of TTIs.

19. The method of claim 17, wherein the two or more grants are downlink grants and the first resource grant is located after the second resource grant in the first TTI of the first set of TTIs.

20. The method of claim 19, wherein the second portion of the scheduling information further includes an indication of a starting location within the first TTI of the first set of TTIs of the second resource grant.

21. The method of claim 17, wherein the first resource grant and second resource grant indicate one or more of a resource assignment, a feedback process identification, a new data indicator (NDI), or a redundancy version (RV).

22. The method of claim 1, wherein the scheduling information comprises UE-specific scheduling information for two or more UEs and an indication of resources on two or more component carriers for the first set of TTIs.

23. The method of claim 22, wherein:
the UE-specific scheduling information for the two or more UEs includes a first resource grant for a first UE that indicates first TTI resources on the second component carrier; and
a second resource grant for a second UE that indicates first TTI resources on the first component carrier, and wherein the first TTI resources are rate-matched around the first resource grant and the second resource grant.

24. A method for wireless communication, comprising:
establishing, by a base station, a connection with a user equipment (UE);
identifying, by the base station and based at least in part on the established connection, a first transmission time interval (TTI) duration for at least a first set of TTIs available for communications over at least a first component carrier and a second component carrier;
identifying, by the base station, a second TTI duration for at least a second set of TTIs available for communications over one or more of the first component carrier or the second component carrier, the first TTI duration being shorter than the second TTI duration;
transmitting, by the base station over the first component carrier, a first portion of scheduling information during a first TTI of the second set of TTIs, wherein the first portion of the scheduling information indicates resources for transmissions over at least a subset of the first set of TTIs having the first TTI duration that is shorter than the second TTI duration; and
transmitting, by the base station over the first component carrier or the second component carrier during a first TTI of the first set of TTIs, a second portion of the scheduling information, wherein the second portion of the scheduling information indicates resources for transmissions over at least a subset of the first set of TTIs.

25. The method of claim 24, further comprising:
transmitting a downlink transmission over the second component carrier based at least in part on the transmitted scheduling information, wherein the transmitted scheduling information comprises a downlink grant.

26. The method of claim 24, further comprising:
receiving an uplink grant transmission over the second component carrier based at least in part on the transmitted scheduling information, wherein the transmitted scheduling information comprises an uplink grant.

27. The method of claim 24, wherein the transmitting the first portion of the scheduling information and the second portion of scheduling information comprises:
transmitting the second portion of the scheduling information over the second component carrier, wherein the second portion of the scheduling information is for the first TTI of the first set of TTIs, and wherein the first portion of the scheduling information is for two or more TTIs in the first set of TTIs.

28. The method of claim 27, wherein:
the first portion of the scheduling information comprises common scheduling information for two or more TTIs of the first set of TTIs for two or more UEs; and
the second portion of the scheduling information comprises UE-specific scheduling information for the first TTI of the first set of TTIs.

29. The method of claim 27, wherein:
the first portion of the scheduling information comprises first UE-specific scheduling information for two or more TTIs of the first set of TTIs; and
the second portion of the scheduling information comprises second UE-specific scheduling information for the first TTI of the first set of TTIs.

30. The method of claim 24, wherein the transmitting the first portion of the scheduling information and the second portion of the scheduling information comprises:
transmitting the second portion of the scheduling information over the first component carrier, wherein the second portion of the scheduling information is for a second TTI of the first set of TTIs that is transmitted over the second component carrier, and wherein the first portion of the scheduling information is for two or more TTIs in the first set of TTIs.

* * * * *